(12) United States Patent
Maeda et al.

(10) Patent No.: US 12,741,635 B2
(45) Date of Patent: Sep. 22, 2026

(54) VEHICLE CONTROL APPARATUS AND VEHICLE CONTROL METHOD

(71) Applicant: DENSO CORPORATION, Kariya-city (JP)

(72) Inventors: Yu Maeda, Nisshin-city (JP); Atsushi Baba, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 107 days.

(21) Appl. No.: 18/824,618

(22) Filed: Sep. 4, 2024

(65) Prior Publication Data

US 2024/0425041 A1 Dec. 26, 2024

Related U.S. Application Data

(63) Continuation of application No. 17/648,768, filed on Jan. 24, 2022, now Pat. No. 12,110,012, which is a continuation of application No. PCT/JP2020/028590, filed on Jul. 23, 2020.

(30) Foreign Application Priority Data

Jul. 26, 2019 (JP) ................................ 2019-138146

(51) Int. Cl.

| | |
|---|---|
| ***B60W 30/095*** | (2012.01) |
| ***B60W 10/04*** | (2006.01) |
| ***B60W 10/20*** | (2006.01) |
| ***B60W 40/02*** | (2006.01) |
| ***B60W 50/02*** | (2012.01) |

(Continued)

(52) U.S. Cl.

CPC .......... *B60W 30/095* (2013.01); *B60W 10/04* (2013.01); *B60W 10/20* (2013.01); *B60W 40/02* (2013.01); *B60W 50/0205* (2013.01); *B60W 60/0015* (2020.02); *B60W 2554/4046* (2020.02); *B60W 2555/20* (2020.02); *B60W 2556/65* (2020.02); *B60W 2710/20* (2013.01); *B60W 2720/10* (2013.01); *B60W 2720/12* (2013.01)

(58) Field of Classification Search

CPC ........... B60W 30/095; B60W 30/0956; B60W 40/105; B60W 40/114; B60W 50/00; G01C 22/00; G05D 1/00

See application file for complete search history.

(56) References Cited

U.S. PATENT DOCUMENTS

| | | | |
|---|---|---|---|
| 8,457,827 B1 * | 6/2013 | Ferguson ............ | B60W 30/095 701/28 |
| 2011/0190972 A1 | 8/2011 | Timmons et al. | |

(Continued)

FOREIGN PATENT DOCUMENTS

| | | |
|---|---|---|
| JP | 2004-117257 A | 4/2004 |
| JP | 2004-118330 A | 4/2004 |

(Continued)

*Primary Examiner* — Tan Q Nguyen

(74) *Attorney, Agent, or Firm* — Precision Patents, P.C.

(57) ABSTRACT

A vehicle control apparatus is mounted in a subject vehicle provided with a running planning unit configured to calculate one or more candidate routes on which the subject vehicle is to travel. The vehicle control apparatus predicts an action of a prediction target moving body that includes the subject vehicle and at least one moving body present in a vicinity of the subject vehicle.

14 Claims, 22 Drawing Sheets

(51) Int. Cl.
*B60W 60/00* (2020.01)
*G08G 1/09* (2006.01)

(56) References Cited

U.S. PATENT DOCUMENTS

2016/0052515 A1* 2/2016 Choi ................. B60W 30/0956 701/1
2016/0059855 A1 3/2016 Rebhan et al.
2016/0159327 A1 6/2016 Flehmig et al.
2016/0375901 A1 12/2016 Di Cairano et al.
2017/0021829 A1 1/2017 Nishimura
2017/0039855 A1 2/2017 Maeda et al.
2017/0113665 A1* 4/2017 Mudalige ............... G08G 1/163
2017/0259816 A1 9/2017 Takeda
2018/0345957 A1 12/2018 Ohmura
2019/0152490 A1* 5/2019 Lan ................... B60W 30/0956
2019/0256088 A1* 8/2019 Sharma ................ G06V 10/764
2019/0291727 A1 9/2019 Shalev-Schwartz et al.
2019/0295179 A1 9/2019 Shalev-Schwartz et al.
2019/0299983 A1 10/2019 Shalev-Schwartz et al.
2019/0329768 A1 10/2019 Shalev-Schwartz et al.
2019/0329769 A1 10/2019 Shalev-Schwartz et al.
2019/0329773 A1 10/2019 Shalev-Schwartz et al.
2019/0329782 A1 10/2019 Shalev-Schwartz et al.
2019/0329783 A1 10/2019 Shalev-Schwartz et al.
2019/0333381 A1 10/2019 Shalev-Schwartz et al.
2020/0089246 A1 3/2020 McGill, Jr. et al.
2020/0180636 A1 6/2020 Oh et al.
2021/0110483 A1 4/2021 Shalev-Schwartz et al.
2021/0110484 A1 4/2021 Shalev-Schwartz et al.
2021/0142421 A1 5/2021 Shalev-Schwartz et al.
2021/0166325 A1 6/2021 Shalev-Schwartz et al.
2021/0247205 A1* 8/2021 Szilágyi ................. G08G 1/164
2021/0269021 A1 9/2021 Shalev-Schwartz et al.
2022/0144257 A1 5/2022 Maeda et al.
2022/0348196 A1* 11/2022 Foltin ................... B60W 30/16

FOREIGN PATENT DOCUMENTS

JP 4946734 B2 6/2012
JP 5443930 B2 3/2014

* cited by examiner

VEHICLE CONTROL APPARATUS AND VEHICLE CONTROL METHOD

CROSS REFERENCE TO RELATED APPLICATIONS

The present application is a continuation application of U.S. patent application Ser. No. 17/648,768 filed on Jan. 24, 2022, which is a continuation application of International Patent Application No. PCT/JP2020/028590 filed on Jul. 23, 2020, which designated the U.S. and claims the benefit of priority from Japanese Patent Application No. 2019-138146 filed on Jul. 26, 2019. The entire disclosures of all of the above applications are incorporated herein by reference.

TECHNICAL FIELD

The present disclosure relates to a vehicle control apparatus and a vehicle control method.

BACKGROUND

Autonomous driving in which driving operation for a vehicle is automatized is known. Utilization of a mathematical expression model mathematizing a concept of safe driving in autonomous driving is also considered.

SUMMARY

The present disclosure provides a vehicle control apparatus. The vehicle control apparatus is mounted in a subject vehicle provided with a running planning unit configured to calculate one or more candidate routes on which the subject vehicle is to travel. The vehicle control apparatus predicts an action of a prediction target moving body that includes the subject vehicle and at least one moving body present in a vicinity of the subject vehicle.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
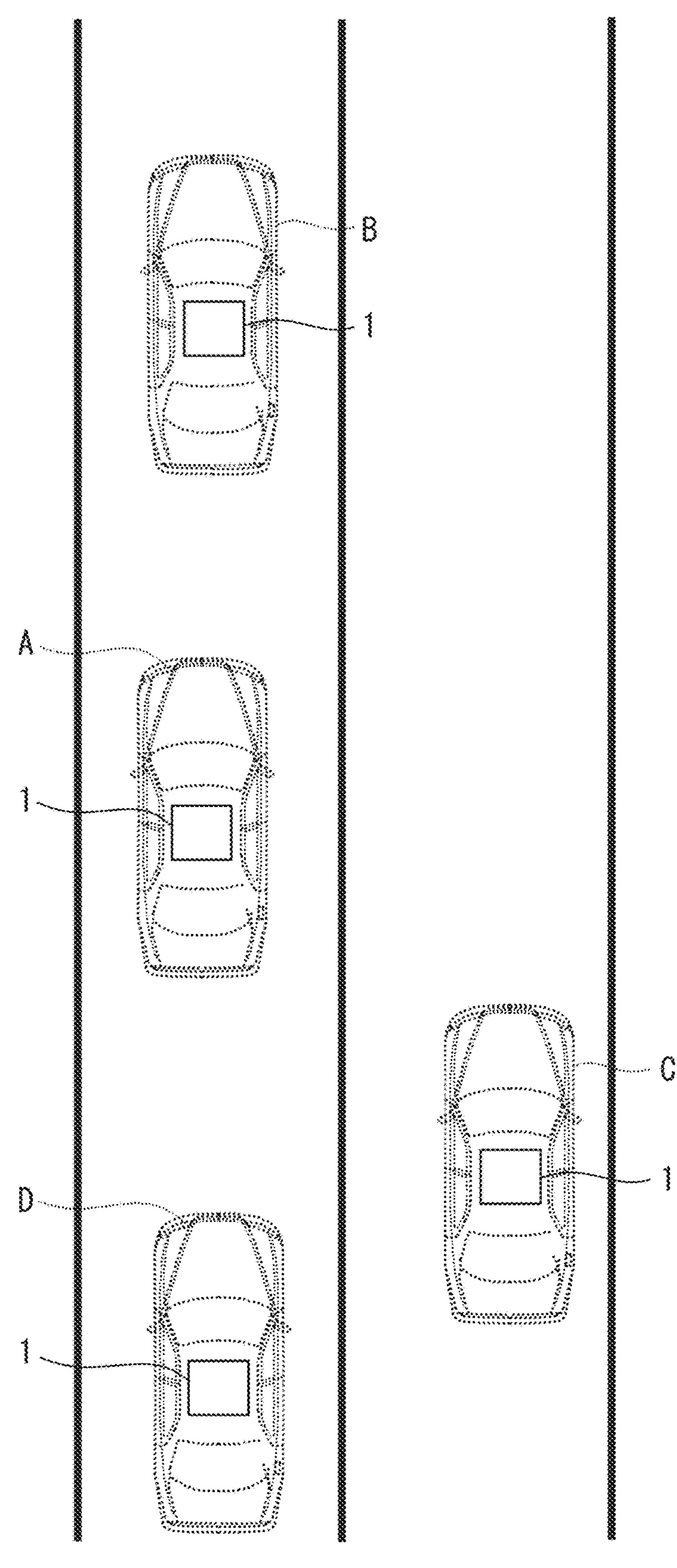
FIG. 1 is a drawing explaining an example of use of a vehicular system 1.

For example, a distance as a basis for evaluating safety between vehicles, calculated by a mathematical expression model called Responsibility Sensitive Safety (RSS) model, is maintained from another vehicle in autonomous driving.

However, it is not assumed a case where a vehicle exhibits a behavior deviating from a behavior in accordance with travel control of the vehicle. Therefore, when the subject vehicle or a nearby vehicle of the subject vehicle exhibits a behavior deviating from a behavior in accordance with control of the vehicle, the subject vehicle and the nearby vehicle may be brought too close to each other. For this and other reasons, it is desired to improve a technique from a viewpoint of reduction of a danger that can occur during traveling of a vehicle.

The present disclosure provides a vehicle control apparatus and a vehicle control method that enable a danger that may occur during traveling of a vehicle to be reduced.

An exemplary embodiment of the present disclosure provides a vehicle control apparatus mounted in a subject vehicle provided with a running planning unit. The running planning unit calculates one or more candidate routes on which the subject vehicle is to travel. The vehicle control apparatus includes an action prediction unit and a responsibility determination unit. The action prediction unit predicts an action of a prediction target moving body that includes the subject vehicle and at least one moving body present in a vicinity of the subject vehicle. The responsibility determination unit determines responsibility for a potential accident assumed when the subject vehicle travels on the candidate route based on the action predicted by the action prediction unit. When the action prediction unit predicts a deviation behavior in which at least either the subject vehicle or a nearby vehicle present in the vicinity of the subject vehicle deviates from a behavior according to a travel control, the action prediction unit predicts the action of the prediction target moving body when the deviation behavior occurs.

Another exemplary embodiment of the present disclosure provides a vehicle control method. The vehicle control method includes: predicting an action of a prediction target moving body that includes a subject vehicle and at least one moving body present in a vicinity of the subject vehicle; predicting the action of the prediction target moving body when predicting a deviation behavior in which at least either the subject vehicle or a nearby vehicle present in the vicinity of the subject vehicle deviates from a behavior according to a travel control; and determining responsibility for a potential accident assumed when the subject vehicle travels on a candidate route as a candidate of a route on which the subject vehicle is to travel based on the predicted action.

In the exemplary embodiment of the present disclosure, the vehicle control apparatus and the vehicle control method determine the responsibility for the potential accident assumed when the subject vehicle travels on the candidate route. Therefore, when an accident occurs while the subject vehicle is traveling on the candidate route, whether the responsibility for the accident accrues to the subject vehicle can be determined in advance.

In addition, when it is predicted that the subject vehicle or a nearby vehicle deviates from a behavior in according with the travel control, the vehicle control apparatus and the vehicle control method predict the action of the prediction target moving body taken when a deviation behavior occurs. Since the action of the prediction target moving body taken when a deviation behavior occurs is predicted as well, the reliability of prediction is enhanced. Therefore, various dangers that can occur during traveling of a vehicle are easily reduced.

A plurality of embodiments for disclosure are described with reference to drawings. For convenience of description, through a plurality of embodiments, parts having the same function as that of a part shown in a figure referenced in preceding description are denoted with the same symbol, and description thereof may be omitted. For the parts denoted with the same symbol, description of other embodiments can be referenced.

First Embodiment

<General Configuration of Vehicular System 1>

Hereafter, a description will be given to a first embodiment of the present disclosure with reference to the drawings. The vehicular system 1 shown in FIG. 1 is used in a vehicle (hereafter, referred to as autonomous driving vehicle) in which autonomous driving is possible. In the description of the first embodiment, a case where the vehicular system 1 is used in a plurality of autonomous driving vehicles will be taken as an example. In the description with reference to FIG. 1, a case where the vehicular system 1 is used in each of four autonomous driving vehicles A to D will be taken as an example but the number of vehicles using the vehicular system 1 need not be four.

Figure 2:
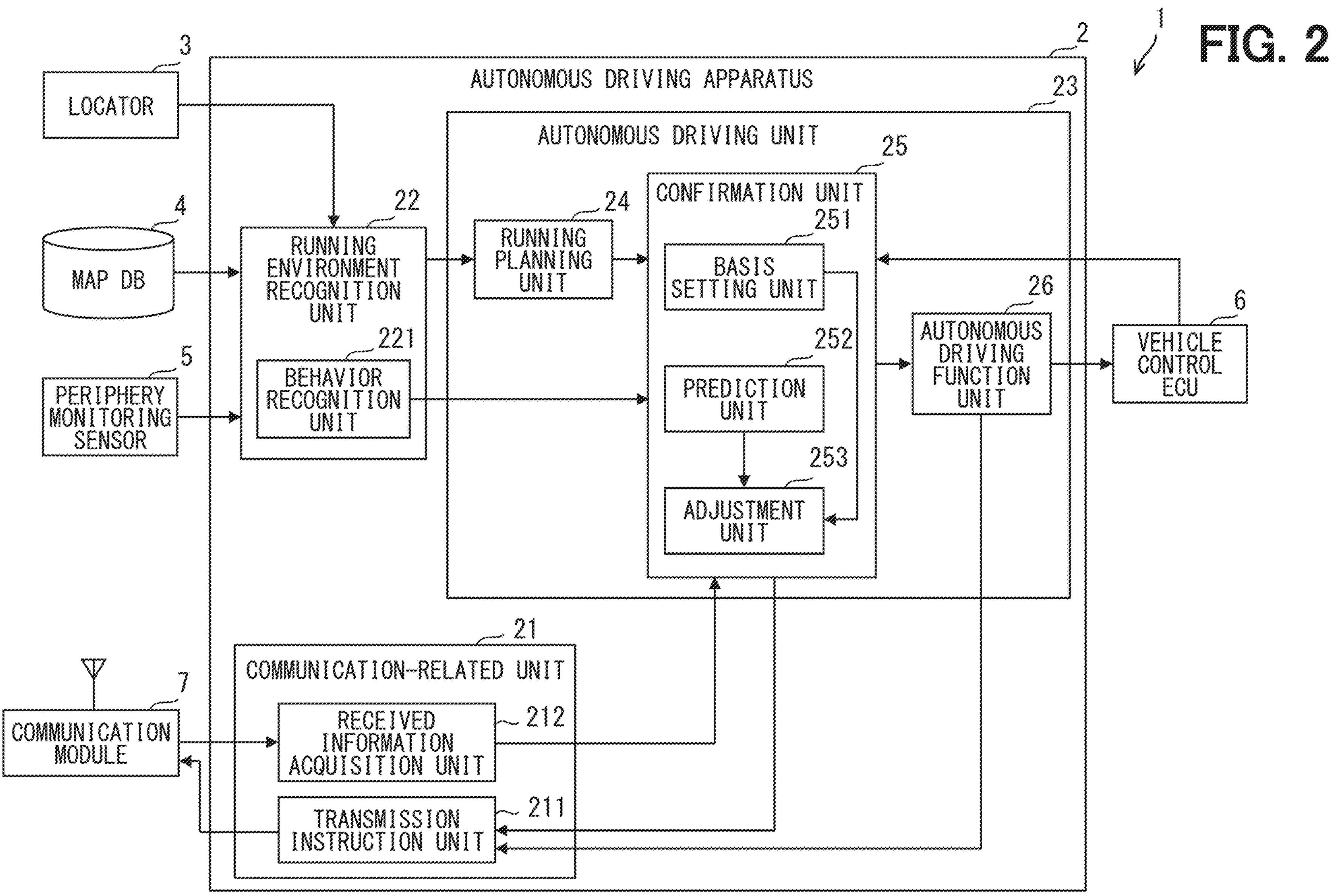
FIG. 2 is a drawing illustrating an example of general configurations of a vehicular system 1 and an autonomous driving apparatus 2.

Subsequently, a description will be given to an example of a general configuration of the vehicular system 1 with reference to FIG. 2. As shown in FIG. 2, the vehicular system 1 includes an autonomous driving apparatus 2, a locator 3, a map database (hereafter, referred to as map DB) 4, a periphery monitoring sensor 5, a vehicle control ECU 6, and a communication module 7. A vehicle using the vehicular system 1 is not limited to an automobile but in the following description, a case where the vehicular system is used in an automobile will be taken as an example.

As mentioned above, an autonomous driving vehicle in the first embodiment only has to be a vehicle in which autonomous driving is possible. With respect to degree of autonomous driving (hereafter, referred to as automatization level), a plurality of levels can be present, for example, as defined by Society of Automotive Engineers (SAE). According to definition by SAE, for example, automatization level is classified into Levels Lv0 to 5 as described below:

Level Lv0 is a level at which a driver performs all the driving tasks without intervention of a system. Examples of driving tasks are steering and acceleration/deceleration. Level Lv0 is equivalent to so-called manual driving. Level Lv1 is a level at which a system assists either steering or acceleration/deceleration. Level Lv2 is a level at which a system assists both steering and acceleration/deceleration. Levels Lv1 to 2 are equivalent to so-called driving assistance.

Level Lv3 is a level at which a system can perform all the driving tasks in such a specific place as a highway and a driver performs driving operation in an emergency. When a driving change is requested from a system at Level Lv3, a driver must be capable of swiftly coping therewith. Level Lv3 is equivalent to so-called conditional autonomous driving. Level Lv4 is a level at which a system can perform all the driving tasks except under specific circumstances, such as a road to which the system cannot accommodate and most extreme environments. Level Lv4 is equivalent to so-called advanced autonomous driving. Level Lv5 is a level at which a system can perform all the driving tasks in every environment. Level Lv5 is equivalent to so-called full autonomous driving. Levels Lv3 to 5 are equivalent to so-called autonomous driving.

An autonomous driving vehicle in the first embodiment may be an autonomous driving vehicle whose automatization level is, for example, Level Lv3 or may be an autonomous driving vehicle whose automatization level is Level Lv4 or higher. An automatization level may be switchable. For example, an automatization level may be switchable between autonomous driving at Level Lv3 or higher and manual driving at Level Lv0. In the following description, a case where an autonomous driving vehicle performs autonomous driving whose automatization level is at least Level Lv3 or higher will be taken as an example.

The locator 3 includes a Global Navigation Satellite System (GNSS) receiver and an inertia sensor. The GNSS receiver receives positioning signals from a plurality of positioning satellites. The inertia sensor includes, for example, a gyro sensor and an acceleration sensor. The locator 3 consecutively locates a vehicle position of the subject vehicle mounted with the locator 3 by combining positioning signals received at the GNSS receiver and a measurement result from the inertia sensor. A vehicle position is expressed, for example, by coordinates of latitude and longitude. Locating of a vehicle position may be configured to use a mileage determined from signals consecutively outputted from a vehicle speed sensor mounted in the vehicle.

The map DB 4 is a nonvolatile memory and holds map data such as link data, node data, road shapes, structures, and the like. Map data may be three-dimensional maps constituted of groups of feature points of road shapes and structures. When a three-dimensional map constituted of groups of feature points of road shapes and structures is used as map data, the locator 3 may be configured to use this three-dimensional map and a detection result from Light Detection and Ranging/Laser Imaging Detection and Ranging (LIDAR) detecting groups of feature points of road shapes and structures or the periphery monitoring sensor 5 including a periphery monitoring camera or the like to locate a position of the subject vehicle without use of a GNSS receiver. The three-dimensional map may be generated based on a picked-up image by Road Experience Management (REM).

The periphery monitoring sensor 5 is an autonomous sensor monitoring an environment surrounding the subject vehicle. For example, the periphery monitoring sensor 5 is used to recognize objects in the vicinity of the subject vehicle, including moving objects such as a pedestrian, an animal other than humans, and a vehicle other than the subject vehicle and stationary objects such as a guardrail, a curb, and a tree. In addition, the periphery monitoring sensor is also used to recognize road markings such as a traveling lane line in the vicinity of the subject vehicle. Examples of the periphery monitoring sensor 5 include a periphery monitoring camera picking up an image of a predetermined range in the vicinity of the subject vehicle, a millimeter wave radar, a sonar, and such a distance measuring sensor as LIDAR transmitting prospecting waves to within a predetermined range surrounding the subject vehicle.

The vehicle control ECU 6 is an electronic control apparatus (that is, travel control apparatus) exercising travel control on the subject vehicle. Examples of travel control include acceleration/deceleration control and/or steering control. Examples of the vehicle control ECU 6 include a steering ECU controlling steering, a power unit control ECU and a brake ECU controlling acceleration/deceleration, and the like. The vehicle control ECU 6 exercises travel control by outputting control signals to each travel control device, such as an electrically controlled throttle, a brake actuator, and an Electric Power Steering (EPS) motor, mounted in the subject vehicle. When a failure is detected in any of these pieces of equipment used in travel control, the vehicle control ECU 6 outputs a diagnosis code (hereafter, referred to as diagnosis code) as a failure code.

The communication module 7 communicates information via wireless communication between the communication module and a communication module 7 of a vehicular system 1 mounted in a nearby vehicle of the subject vehicle (hereafter, referred to as inter-vehicle communication). The communication module 7 may communicate information between the communication module and roadside equipment installed on a roadside via wireless communication (hereafter, referred to as vehicle roadside communication). The communication module 7 may communicate information between the communication module and a center external to the subject vehicle via wireless communication (hereafter, referred to as wide area communication). When vehicles communicate information between the vehicles via a center by wide area communication, information including vehicle positions are communicated. Thus, an adjustment only has to be made at the center based on the vehicle positions so that vehicle information is communicated between the vehicles within a certain range. The communication module 7 may receive map data delivered from an external server delivering map data and store the map data in the map DB 4.

The autonomous driving apparatus 2 includes, for example, a processor, a memory, I/O, and a bus connecting these items and performs processing related to autonomous driving by executing a control program stored in the memory. The memory cited here is a non-transitory tangible storage medium non-temporarily storing computer-readable programs and data. The non-transitory tangible storage medium is implemented by a semiconductor memory, a magnetic disk, or the like. Details of the autonomous driving apparatus 2 will be described below:

<General Configuration of Autonomous Driving Apparatus 2>

Subsequently, a description will be given to a general configuration of the autonomous driving apparatus 2 with reference to FIG. 2. As shown in FIG. 2, the autonomous driving apparatus 2 includes a communication-related unit 21, a running environment recognition unit 22, and an autonomous driving unit 23 as functional blocks. All or part of the functionality performed by the autonomous driving apparatus 2 may be configured by hardware using one or more ICs or the like. All or some of the functional blocks provided in the autonomous driving apparatus 2 may be implemented by a combination of execution of software by a processor and a hardware member.

The communication-related unit 21 includes a transmission instruction unit 211 and a received information acquisition unit 212 as sub-functional blocks. The received information acquisition unit 212 acquires information received at the communication module 7. The transmission instruction unit 211 instructs to transmit information from the communication module 7. For example, the transmission instruction unit 211 causes information about future travel control of the subject vehicle to be exercised by the autonomous driving function unit 26 to be transmitted from the communication module 7. The received information acquisition unit 212 acquires information about future travel control of a nearby vehicle transmitted from the nearby vehicle via the communication module 7. When information about travel control of a vehicle is communicated, it is preferable to include, in the communication, identification information such as information on a vehicle position of that vehicle and a vehicle ID for identifying that vehicle to make that vehicle identifiable. As this information about travel control of a nearby vehicle, for example, information about travel control of the nearby vehicle exercised at an autonomous driving function unit 26 of the nearby vehicle can be taken.

The running environment recognition unit 22 recognizes a running environment of the subject vehicle form a subject vehicle position acquired from the locator 3, map data acquired from the map DB 4, sensing information acquired from the periphery monitoring sensor 5, and the like. In an example, the running environment recognition unit 22 uses these pieces of information to recognize a position, a shape, and a state of movement of an object in the vicinity of the subject vehicle and generates a virtual space mimicking an actual running environment. The running environment recognition unit 22 preferably recognizes a distance of the subject vehicle from a nearby vehicle, a relative speed of a nearby vehicle to the subject vehicle, and the like as well from sensing information acquired from the periphery monitoring sensor 5 as a running environment. When positional information and speed information of a nearby vehicle or the like can be acquired via the communication module 7, the running environment may be recognized using these pieces of information.

The running environment recognition unit 22 includes a behavior recognition unit 221 as a sub-functional block. The behavior recognition unit 221 uses a result of detection at the periphery monitoring sensor 5 provided in the subject vehicle to recognize a state of movement (that is, behavior) of a nearby vehicle. The behavior recognition unit 221 can recognize a behavior of a nearby vehicle from a change in the nearby vehicle in a running environment consecutively recognized at the running environment recognition unit 22. For example, acceleration/deceleration and accelerated speed/decelerated speed of a nearby vehicle in the front-back direction can be recognized from a rate of change in a position of the nearby vehicle in the front-back direction per unit time. For example, turning and a yaw rate of a nearby vehicle can be recognized from a rate of change in an orientation of the nearby vehicle per unit time relative to a center line of a running lane or the like.

The autonomous driving unit 23 performs processing related to proxy of driving operation by a driver. As shown in FIG. 2, the autonomous driving unit 23 includes a running planning unit 24, a confirmation unit 25, and the autonomous driving function unit 26 as sub-functional blocks.

The running planning unit 24 generates a running plan for running the subject vehicle by autonomous driving, using a running environment recognized at the running environment recognition unit 22. For example, as a medium and long-term running plan, the running planning unit 24 generates a recommended route for causing the subject vehicle to head from the present position for a destination by performing route search processing. In addition, as a short-term running plan for running according to a medium and long-term running plan, a running plan for lane change, a running plan for running along a lane center, a running plan for following a preceding car, a running plan for avoiding an obstacle, and the like are generated. To generate a running plan at the running planning unit 24, for example, a route at a certain distance from a recognized traveling lane line or along the center of the lane can be calculated or a route in accordance with a behavior or a running path of a recognized preceding car can be calculated.

The generation of the running plan by the running planning unit 24 may be performed by calculation of a route deemed to be most suitable by machine learning or the like. When a route deemed to be most suitable is calculated by machine learning, a route calculation algorism for calculating a route includes a neural network. Examples of values inputted to the neural network are a distance between the subject vehicle and a nearby vehicle and a relative speed of a nearby vehicle to the subject vehicle. Besides, various running environments recognized by the running environment recognition unit 22 may be inputted to the neural network. An output of the neural network is a route.

This neural network is learned by such machine learning as reinforcement learning. A plurality of types of route calculation algorisms can be prepared. A difference between the route calculation algorisms is a difference in driving policy. A driving policy indicates a degree and frequency of acceleration/deceleration and steering control when a vehicle is run by autonomous driving. A driving policy manifests itself, for example, in a difference of whether acceleration/deceleration is sudden or slow. Which route calculation algorism should be used among a plurality of route calculation algorisms respectively corresponding to a plurality of driving policies can be selected by an occupant of a vehicle. When a route is calculated according to a selected route calculation algorism, it can be said that a route is calculated based on a driving policy corresponding to that route calculation algorism.

The running planning unit 24 calculates one or more routes as a short-term running plan. For example, the running planning unit 24 can be configured to include information on acceleration/deceleration for speed adjustment in a calculated route as a short-term running plan.

The confirmation unit 25 evaluates safety of a running plan generated at the running planning unit 24. For example, to facilitate evaluation of safety of a running plan, the confirmation unit 25 can use a mathematical expression model obtained by mathematizing a concept of safe driving to evaluate safety of a running plan. For a mathematical expression model, for example, a Responsibility Sensitive Safety (RSS) model can be used. The confirmation unit 25 can evaluate safety according to whether or not a distance (hereafter, referred to as nearby vehicle distance) between the subject vehicle and a nearby vehicle is equal to or longer than a distance (hereafter, referred to as safe distance) as a basis for evaluating safety between vehicles, calculated by a preset mathematical expression model. For example, a distance in a front-back direction and/or crosswise direction of the subject vehicle can be taken as a nearby vehicle distance. A nearby vehicle distance is equivalent to an inter-target distance.

A mathematical expression model does not assure that an accident will not occur at all but assures that when a nearby vehicle distance falls below a safe distance, the subject vehicle will not be on the side having responsibility for any accident by taking an appropriate action for collision avoidance.

The confirmation unit 25 includes a basis setting unit 251, a prediction unit 252, and an adjustment unit 253 as sub-functional blocks and gives a margin to a safe distance according to the circumstances. A more detailed description will be given. When an occurrence of a behavior (hereafter, referred to as deviation behavior) deviating from a behavior in accordance with travel control of the subject vehicle or a nearby vehicle is predicted, a safe distance calculated using a mathematical expression model is provided with a margin. When an occurrence of a deviation behavior of the subject vehicle or a nearby vehicle is not predicted, a safe distance calculated using a mathematical expression model is not provided with a margin.

The basis setting unit 251 calculates a safe distance using the above-mentioned mathematical expression model. For a mathematical expression model, for example, an RSS model can be used. A safe distance calculated at the basis setting unit 251 is taken as a default safe distance.

The prediction unit 252 predicts an occurrence of a deviation behavior of the subject vehicle or a nearby vehicle. The prediction unit 252 can detect, for example, a failure in a mechanism related to a behavior of the subject vehicle to predict an occurrence of a deviation behavior of the subject vehicle. For example, the prediction unit 252 can detect a failure in a mechanism related to a behavior of the subject vehicle from a diagnosis code outputted by the vehicle control ECU 6 to predict an occurrence of a deviation behavior of the subject vehicle. For example, the autonomous driving apparatus 2 can acquire this diagnosis code via an in-vehicle LAN. For example, a diagnosis code indicating a brake failure or the like can be taken as the diagnosis code.

When an occurrence of a deviation behavior of the subject vehicle is predicted by detecting a failure in a mechanism related to a behavior of the subject vehicle at the prediction unit 252, it is preferable that the transmission instruction unit 211 transmits information indicating a failure in the mechanism related to a behavior of the subject vehicle from the communication module 7 to a nearby vehicle. To transmit information from the communication module 7 to a nearby vehicle, the information may be directly transmitted by inter-vehicle communication or indirectly transmitted by vehicle roadside communication or wide area communication.

The prediction unit 252 predicts an occurrence of a deviation behavior, for example, based on a divergence between a behavior in accordance with travel control at a nearby vehicle and an actual behavior of the nearby vehicle recognized using an autonomous sensor of the subject vehicle. For example, when there is a nearby vehicle whose divergence between a behavior in accordance with travel control indicated by information about travel control at the nearby vehicle, acquired at the received information acquisition unit 212 and a behavior recognized at the behavior recognition unit 221 is equal to or greater than a predetermined value, the prediction unit 252 can predict an occurrence of a deviation behavior of that nearby vehicle. With respect to a nearby vehicle whose divergence is less than the predetermined value, an occurrence of a deviation behavior need not be predicted. The predetermined value cited here is a value for determining whether a behavior deviates from a behavior in accordance with travel control and can be arbitrarily set. Since a vehicle that exhibited a deviation behavior once most probably exhibits a deviation behavior again, an occurrence of a deviation behavior of a nearby vehicle can be predicted by the above-mentioned configuration. Circumstances under which a behavior deviating from a behavior in accordance with travel control include a skid of a vehicle, a failure, and the like.

For example, the prediction unit 252 can predict an occurrence of a deviation behavior, taking accelerated speed/decelerated speed in accordance with acceleration/deceleration control of travel control and actual accelerated speed/decelerated speed recognized at the behavior recognition unit 221 to be compared. Besides, the prediction unit 252 may take a yaw rate in accordance with steering control of travel control and an actual yaw rate recognized at the behavior recognition unit 221 to be compared to predict an occurrence of a deviation behavior. A nearby vehicle whose travel control information is acquired at the received information acquisition unit 21 and a nearby vehicle whose behavior is recognized at the behavior recognition unit 221 can be associated with each other, for example, based on the vehicle positions of the nearby vehicles.

When an occurrence of a deviation behavior of a nearby vehicle is predicted at the prediction unit 252, it is preferable that the transmission instruction unit 211 transmits information indicating the prediction of the occurrence of the deviation behavior of that nearby vehicle from the communication module 7 to the nearby vehicle. When information is transmitted from the communication module 7 to a nearby vehicle, the information may be directly transmitted by inter-vehicle communication or indirectly transmitted by vehicle roadside communication or wide area communication. It is preferable that the communication module 7 includes information, such as vehicle ID, allowing a vehicle an occurrence of a deviation behavior of which is predicted to be identified when transmitting the information indicating that an occurrence of a deviation behavior of the vehicle is predicted to the nearby vehicle. Thus, at the nearby vehicle that received the information indicating that an occurrence of a deviation behavior of the vehicle is predicted, whether the information is information indicating that an occurrence of a deviation behavior of the subject vehicle is predicted or information indicating that an occurrence of a deviation behavior of another vehicle is predicted can be determined.

An example will be taken. It will be assumed that the prediction unit 252 acquires information indicating a failure in a mechanism related to a behavior of a nearby vehicle, transmitted from a communication module 7 of a vehicular system 1 used in that nearby vehicle, at the received information acquisition unit 212 via the communication module of the subject vehicle. In this example, an occurrence of a deviation behavior of that nearby vehicle may be predicted. In this case, the transmission instruction unit 211 may transmit information indicating an occurrence of the deviation behavior of that nearby vehicle is predicted from the communication module 7 to the nearby vehicle. A failure in a mechanism related to a behavior of that nearby vehicle can be detected at the prediction unit 252 of the vehicular system 1 used in that nearby vehicle.

An example will be taken. It will be assumed that the prediction unit 252 acquires information indicating that an occurrence of a deviation behavior of another vehicle as a second nearby vehicle other than a first nearby vehicle, transmitted from the communication module 7 of the vehicular system 1 used in the first nearby vehicle, at the received information acquisition unit 212. In this example, an occurrence of a deviation behavior of that another vehicle may be predicted. In this case, the transmission instruction unit 211 may transmit information indicating that an occurrence of a deviation behavior of that another vehicle is predicted from the communication module 7 to the first nearby vehicle.

An example will be taken. It will be assumed that the prediction unit 252 acquires information indicating that an occurrence of a deviation behavior of the subject vehicle is predicted, transmitted from the communication module 7 of the vehicular system 1 used in a nearby vehicle, at the received information acquisition unit 212. In this example, an occurrence of a deviation behavior of the subject vehicle may be predicted. In this case, the transmission instruction unit 211 may transmit information indicating that an occurrence of a deviation behavior of the subject vehicle is predicted from the communication module 7 to the nearby vehicle. In this case, at this nearby vehicle, the occurrence of the deviation behavior of the subject vehicle can be predicted at the prediction unit 252 used in the nearby vehicle based on a divergence between information obtained by communication and information obtained by an autonomous sensor and then information indicating that an occurrence of a deviation behavior of the subject vehicle is predicted can be transmitted.

When an occurrence of a deviation behavior of a target vehicle as the subject vehicle or a nearby vehicle is predicted at the prediction unit 252, the adjustment unit 253 increases a safe distance as compared with a case where an occurrence of a deviation behavior of that target vehicle is not predicted at the prediction unit 252. For example, when an occurrence of a deviation behavior of a target vehicle is predicted at the prediction unit 252, the adjustment unit 253 sets, as a safe distance, a distance obtained by adding a margin to a default safe distance set at the basis setting unit 251. When an occurrence of a deviation behavior of a target vehicle is not predicted at the prediction unit 252, a default safe distance set at the basis setting unit 251 is maintained as a set safe distance. That is, when an occurrence of a deviation behavior of a target vehicle is predicted at the prediction unit 252, the adjustment unit 253 provides a default safe distance with a margin to increase a safe distance as compared with a case where an occurrence of a deviation behavior of a target vehicle is not predicted at the prediction unit 252.

When an occurrence of a deviation behavior of a target vehicle is predicted at the prediction unit 252, it is preferable that the adjustment unit 253 varies an amount of a margin added to a default safe distance according to various factors related to the circumstances under which the subject vehicle is placed. Examples of the factors include a quantity of nearby vehicles (hereafter, referred to as a number of nearby vehicles) of the subject vehicle, a nearby vehicle distance, a distance (hereafter, referred to as structure distance) between the subject vehicle and a structure in the vicinity of the subject vehicle, and the like. For example, nearby vehicles whose distances from a vehicle position of the subject vehicle are within a certain range can be counted in a number of nearby vehicles. For example, a distance of a structure in the crosswise direction of the subject vehicle can be taken as a structure distance of the structure.

Depending on the circumstance under which the subject vehicle is placed, a scope for the subject vehicle to run avoiding a nearby vehicle and a structure varies and a scope to avoid approach to a nearby vehicle varies as well. Further, an occupant's feeling of psychological pressure varies as well according to a scope to avoid approach to a nearby vehicle. According to the above-mentioned configuration, an amount of a margin added to a default safe distance is varied according to various factors about the circumstances under which the subject vehicle is placed; therefore, an amount of a margin added to a default safe distance can be varied so that an avoidance action can be easily taken to avoid approach to a nearby vehicle. For example, the configuration may increase an amount of a margin added to a default safe distance with reduction in a scope to run avoiding a nearby vehicle and a structure. Thus, an avoidance action is more early taken to avoid approach to a nearby vehicle with reduction in a scope to run avoiding a nearby vehicle and a structure. As a result, an avoidance action can be taken with an allowance before avoidance of approach to a nearby vehicle becomes difficult. By taking an avoidance action to avoid approach to a nearby vehicle more early with reduction in a scope to run avoiding a nearby vehicle and a structure, an occupant's feeling of psychological pressure can be made less prone to occur.

As a number of nearby vehicles is increased, a scope for the subject vehicle to run avoiding a nearby vehicle and a structure is more reduced and an occupant's feeling of psychological pressure is more increased. Therefore, it is preferable that the adjustment unit 253 increases an amount of a margin added to a default safe distance, for example, according to increase in a number of nearby vehicles.

As a nearby vehicle distance becomes shorter, a scope for the subject vehicle to run avoiding a nearby vehicle is reduced and a structure is more reduced and an occupant's feeling of psychological pressure is more increased. Therefore, it is preferable that the adjustment unit 253 increases an amount of a margin added to a default safe distance, for example, according to reduction in nearby vehicle distance. When a plurality of nearby vehicles are present, the configuration may take a shortest nearby vehicle distance as a target and increase an amount of a margin added to a default safe distance according to reduction in the nearby vehicle distance. When an amount of a margin is varied according to a nearby vehicle distance, it is preferable that the adjustment unit 253 is prevented from varying an amount of a margin for a certain period of time after varying an amount of a margin to suppress fluctuation in a safe distance including a margin.

As a structure distance becomes shorter, a scope for the subject vehicle to run avoiding a nearby vehicle and a structure is more reduced and an occupant's feeling of psychological pressure is more increased. Therefore, it is preferable that the adjustment unit 253 increases an amount of a margin added to a default safe distance, for example, according to reduction in structure distance. When a plurality of structures are present in the vicinity of the subject vehicle, the configuration may take a structure at a shortest distance as a target and increase an amount of a margin added to a default safe distance according to reduction in structure distance.

When an amount of a margin is varied according to a plurality of types of factors, the adjustment unit 253 can be configured to add a margin obtained, for example, by summing amounts of change determined for individual factors to a default safe distance.

It is supposed that an influence on an occupant's feeling of psychological pressure differs according to types of the above-mentioned factors. Therefore, the adjustment unit 253 may make an upper limit width of a margin different according to types of the above-mentioned factors. According to the above-mentioned configuration, an upper limit width of a margin added to a default safe distance is made different according to types of the above-mentioned factors. Therefore, by giving a more margin to a factor more prone to give a feeling of psychological pressure to an occupant, a feeling of psychological pressure can be made less prone to be given to an occupant.

For example, it is supposed that an occupant's feeling of psychological pressure is greater under the circumstances under which a number of nearby vehicles is small but a nearby vehicle distance is short than under the circumstances under which a number of nearby vehicles is large but a nearby vehicle distance is long. Unlike structures, nearby vehicles move. Therefore, it is supposed that an occupant's feeling of psychological pressure is greater under the circumstance under which a nearby vehicle distance is short than under the circumstances under which a structure distance is short. Therefore, when the adjustment unit 253 provides a default safe distance with a margin, it is preferable that an upper limit width of a margin according to a nearby vehicle distance among a number of nearby vehicles, a nearby vehicle distance, and a structure distance is made larger than an upper limit width of a margin according to the other factors. According to the foregoing, by somewhat increasing a margin corresponding to a nearby vehicle distance, a factor that is supposed to prone to give a feeling of psychological pressure to an occupant, as compared with those according to the other factors, an occupant's feeling of psychological pressure can be made less prone to occur.

When a nearby vehicle distance is equal to or longer than a safe distance set at the adjustment unit 253, the confirmation unit 25 can evaluate that a running plan generated at the running planning unit 24 is safe. Meanwhile, when a nearby vehicle distance is less than the safe distance, the confirmation unit 25 can evaluate that a running plan generated at the running planning unit 24 is unsafe. The confirmation unit 25 can output a running plan evaluated as safe to the autonomous driving function unit 26. With respect to a running plan evaluated as unsafe, the confirmation unit 25 can modify the plan, for example, into a running plan evaluated as safe before outputting the plan to the autonomous driving function unit 26. That is, whether to use a route calculated at the running planning unit 24 in autonomous driving is evaluated according to whether or not a nearby vehicle distance is equal to or longer than a safe distance.

The autonomous driving function unit 26 can cause the vehicle control ECU 6 to automatically perform acceleration/deceleration and/or steering of the subject vehicle in accordance with a running plan outputted from the confirmation unit 25 to deputize for a driver's driving operation (that is, autonomous driving).

The autonomous driving function unit 26 causes autonomous driving in accordance with a route evaluated to be used in autonomous driving at the confirmation unit 25. By causing autonomous driving in accordance with a running plan outputted from the confirmation unit 25, the autonomous driving function unit 26 causes an avoidance action for avoiding approaching between the subject vehicle and a nearby vehicle by autonomous driving.

Figure 3:
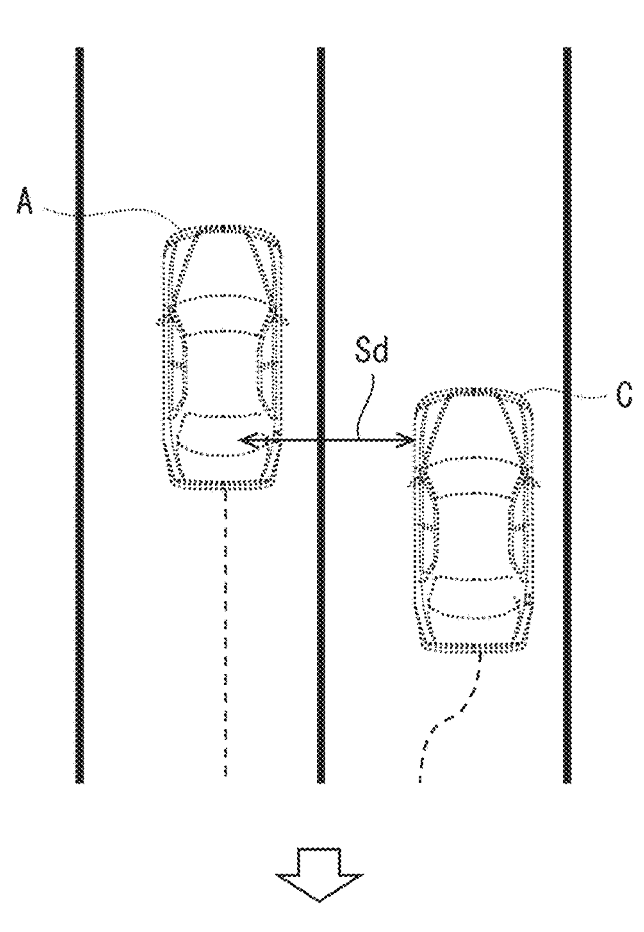
FIG. 3 is a drawing explaining an example of an avoidance action.
Figure 3:
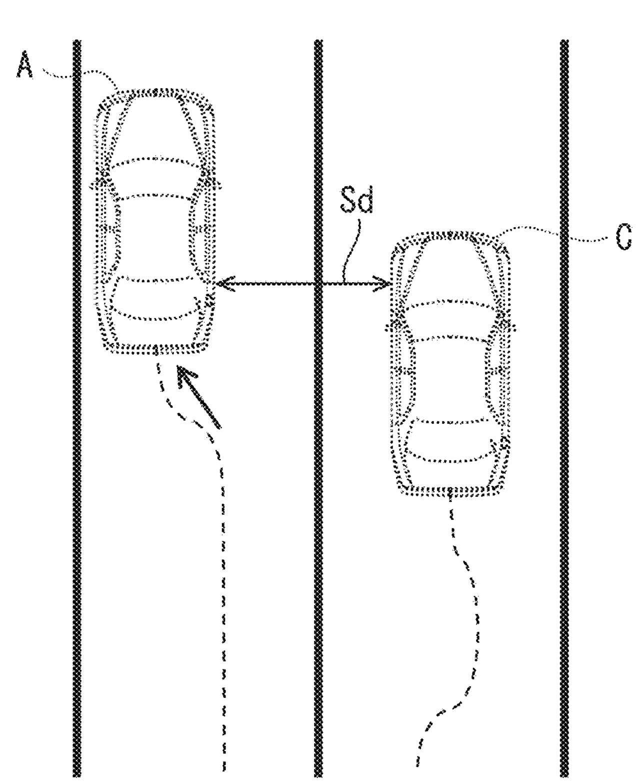
Figure 4:
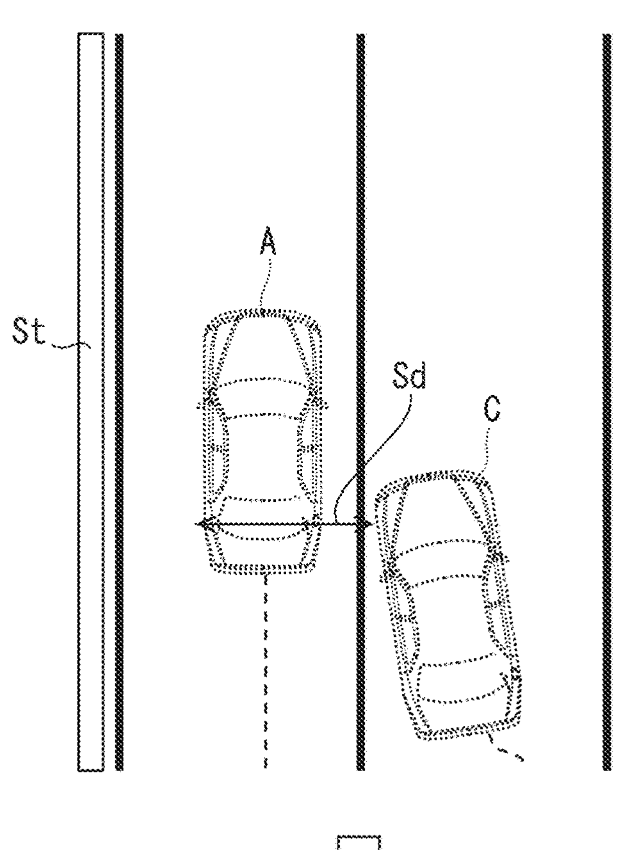
FIG. 4 is a drawing explaining an example of an avoidance action.
Figure 4:
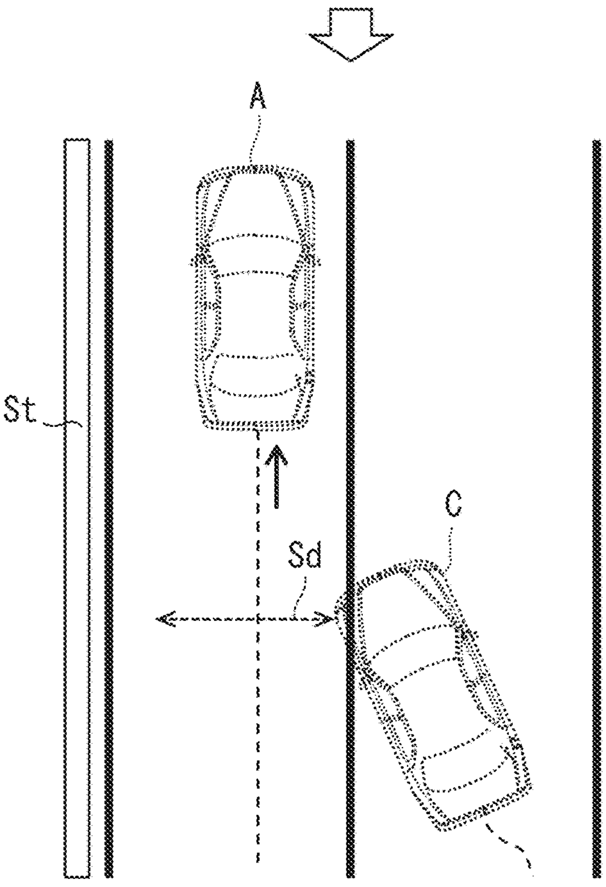

A description will be given to an example of an avoidance action taken when a nearby vehicle distance becomes shorter than a safe distance set at the adjustment unit 253. First, a description will be given to an example of an avoidance action taken when a nearby vehicle distance in the crosswise direction of the subject vehicle becomes shorter than a safe distance with reference to FIG. 3 and FIG. 4. FIG. 3 shows an example under the circumstances under which there is a scope to make a nearby vehicle distance in the crosswise direction of the subject vehicle equal to or longer than a safe distance. FIG. 4 shows an example under the circumstances under which there is not a scope to make a nearby vehicle distance in the crosswise direction of the subject vehicle equal to a longer than a safe distance. In FIG. 3 and FIG. 4, A denotes the subject vehicle; C denotes a nearby vehicle as a parallel running car; Sd denotes a safe distance; and a broken line indicates a running path. In FIG. 4, St denotes a structure. The example in FIG. 4 is based on the assumption that there is not a scope to make a nearby vehicle distance in the crosswise direction of the subject vehicle A equal to or longer than a safe distance because of the presence of, for example, the structure St such as a guardrail. In the examples in FIG. 3 and FIG. 4, a nearby vehicle to which a nearby vehicle distance is applied is the parallel running car C.

As shown in FIG. 3, under the circumstances under which there is a scope to make a nearby vehicle distance in the crosswise direction of the subject vehicle A equal to or longer than a safe distance, the confirmation unit 25 modifies a running plan to make the nearby vehicle distance in the crosswise direction of the subject vehicle A equal to or longer than the safe distance. In this case, as shown in FIG. 3, the autonomous driving function unit 26 causes autonomous driving so that the nearby vehicle distance in the crosswise direction of the subject vehicle A is made equal to or longer than the safe distance. For example, the autonomous driving function unit 26 can shift a position of the subject vehicle A in the crosswise direction by steering control to cause this autonomous driving. According to the foregoing, an avoidance action is taken to make a nearby vehicle distance equal to or longer than a safe distance and thus the possibility of collision between the subject vehicle A and the parallel running car C can be reduced.

Meanwhile, as shown in FIG. 4, under the circumstances under which there is not a scope to make a nearby vehicle distance in the crosswise direction of the subject vehicle A equal to or longer than a safe distance, the confirmation unit 25 modifies a running plan to shift a position of the subject vehicle A in the front-back direction relative to the parallel running car C. Thus, positions of the subject vehicle A and the parallel running car C in the front-back direction of the subject vehicle A are shifted. As a result, the parallel running car C becomes a non-target of comparison of safe distance and a running plan is not evaluated as unsafe in terms of relation to the parallel running car C. In this case, as shown in FIG. 4, the autonomous driving function unit 26 causes autonomous driving so that positions of the subject vehicle A and the parallel running car C are shifted in the front-back direction of the subject vehicle A. For example, the autonomous driving function unit 26 can shift a position of the subject vehicle A in the front-back direction by acceleration/deceleration control to cause this autonomous driving. In the example in FIG. 4, a position of the subject vehicle A in the front-back direction is shifted by acceleration control to cause this autonomous driving. According to the foregoing, even when a nearby vehicle distance cannot be made equal to or longer than a safe distance, positions of the subject vehicle A and the parallel running car C in the front-back direction can be shifted to take an avoidance action and thus the possibility of collision can be reduced.

Figure 5:
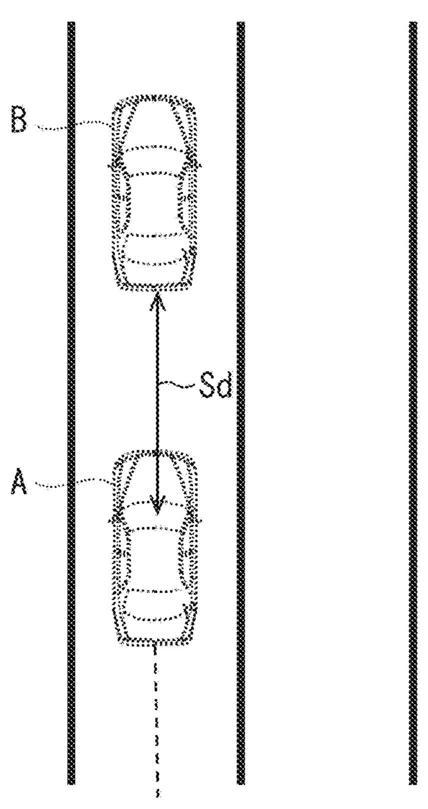
FIG. 5 is a drawing explaining an example of an avoidance action.
Figure 5:
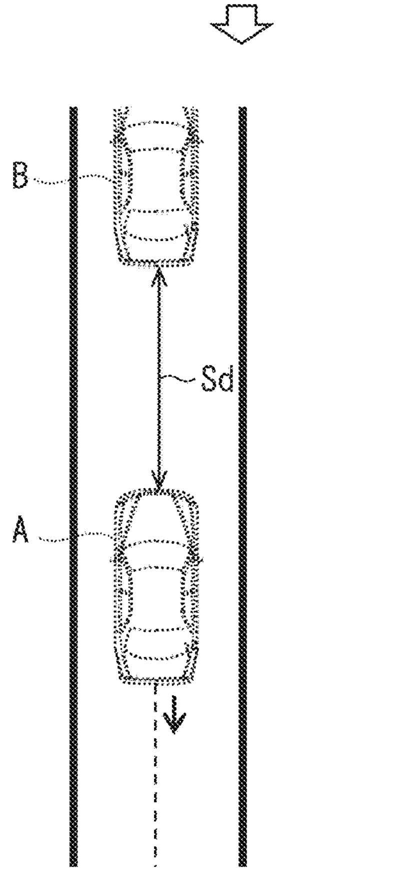
Figure 6:
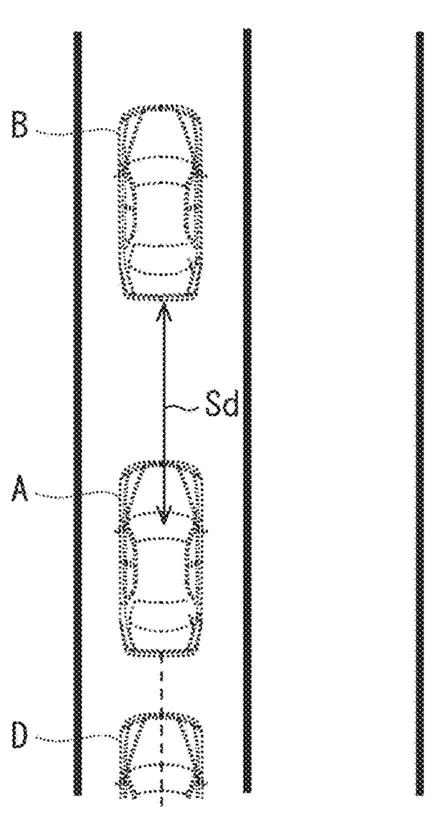
FIG. 6 is a drawing explaining an example of an avoidance action.
Figure 6:
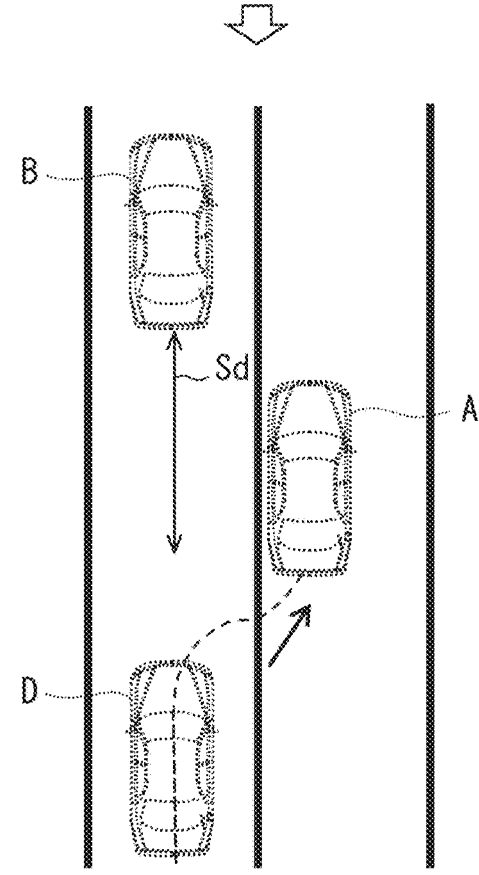

Subsequently, a description will be given to an example of an avoidance action taken when a nearby vehicle distance in the front-back direction of the subject vehicle becomes shorter than a safe distance with reference to FIG. 5 and FIG. 6. FIG. 5 shows an example under the circumstances under which there is a scope to make a nearby vehicle distance in the front-back direction of the subject vehicle equal to or longer than a safe distance. FIG. 6 shows an example under the circumstances under which there is not a scope to make a nearby vehicle distance in the front-back direction of the subject vehicle equal to or longer than a safe distance. In FIG. 5 and FIG. 6, A denotes the subject vehicle; B denotes a nearby vehicle as a preceding car to the subject vehicle; D denotes a nearby vehicle as a following car to the subject vehicle; Sd denotes a safe distance; and a broken line indicates a running path. The example in FIG. 6 is based on the assumption that there is not a scope to make a nearby vehicle distance in the front-back direction of the subject vehicle A equal to or longer than a safe distance because of the presence of the following car D. In the examples in FIG. 5 and FIG. 6, a nearby vehicle to which a nearby vehicle distance is applied is the preceding car B.

As shown in FIG. 5, under the circumstances under which there is a scope to make a nearby vehicle distance in the front-back direction of the subject vehicle A equal to or longer than a safe distance, the confirmation unit 25 modifies a running plan to make the nearby vehicle distance in the front-back direction of the subject vehicle A equal to or longer than the safe distance. In this case, as shown in FIG. 5, the autonomous driving function unit 26 causes autonomous driving so that the nearby vehicle distance in the front-back direction of the subject vehicle A is made equal to or longer than the safe distance. For example, the autonomous driving function unit 26 can shift a position of the subject vehicle A in the front-back direction by acceleration/deceleration control to cause this autonomous driving. In the example in FIG. 5, a position of the subject vehicle A in the front-back direction is shifted by deceleration to cause this autonomous driving. According to the foregoing, an avoidance action is taken to make a nearby vehicle distance equal to or a longer than a safe distance and thus the possibility of collision between the subject vehicle A and the preceding car B can be reduced.

Meanwhile, as shown in FIG. 6, under the circumstances under which there is not a scope to make a nearby vehicle distance in the front-back direction of the subject vehicle A equal to or longer than a safe distance, the confirmation unit 25 modifies a running plan to shift positions of the subject vehicle A and the preceding car B in the crosswise direction of the subject vehicle A. Thus, positions of the subject vehicle A and the preceding car B in the crosswise direction of the subject vehicle A are shifted. As a result, the preceding car B becomes a non-target of comparison of safe distance and a running plan is not evaluated as unsafe in terms of relation to the preceding car B. In this case, as shown in FIG. 6, the autonomous driving function unit 26 causes autonomous driving so that positions of the subject vehicle A and the preceding car B in the crosswise direction of the subject vehicle A are misaligned. For example, the autonomous driving function unit 26 can shift a position of the subject vehicle A in the crosswise direction by steering control to cause this autonomous driving. According to the foregoing, even when a nearby vehicle distance cannot be made equal to or longer than a safe distance, positions of the subject vehicle A and the preceding car B in the crosswise direction are made misaligned to taken an avoidance action and thus the possibility of collision can be reduced.

<Autonomous Driving-Related Processing in Autonomous Driving Apparatus 2>

Figure 7:
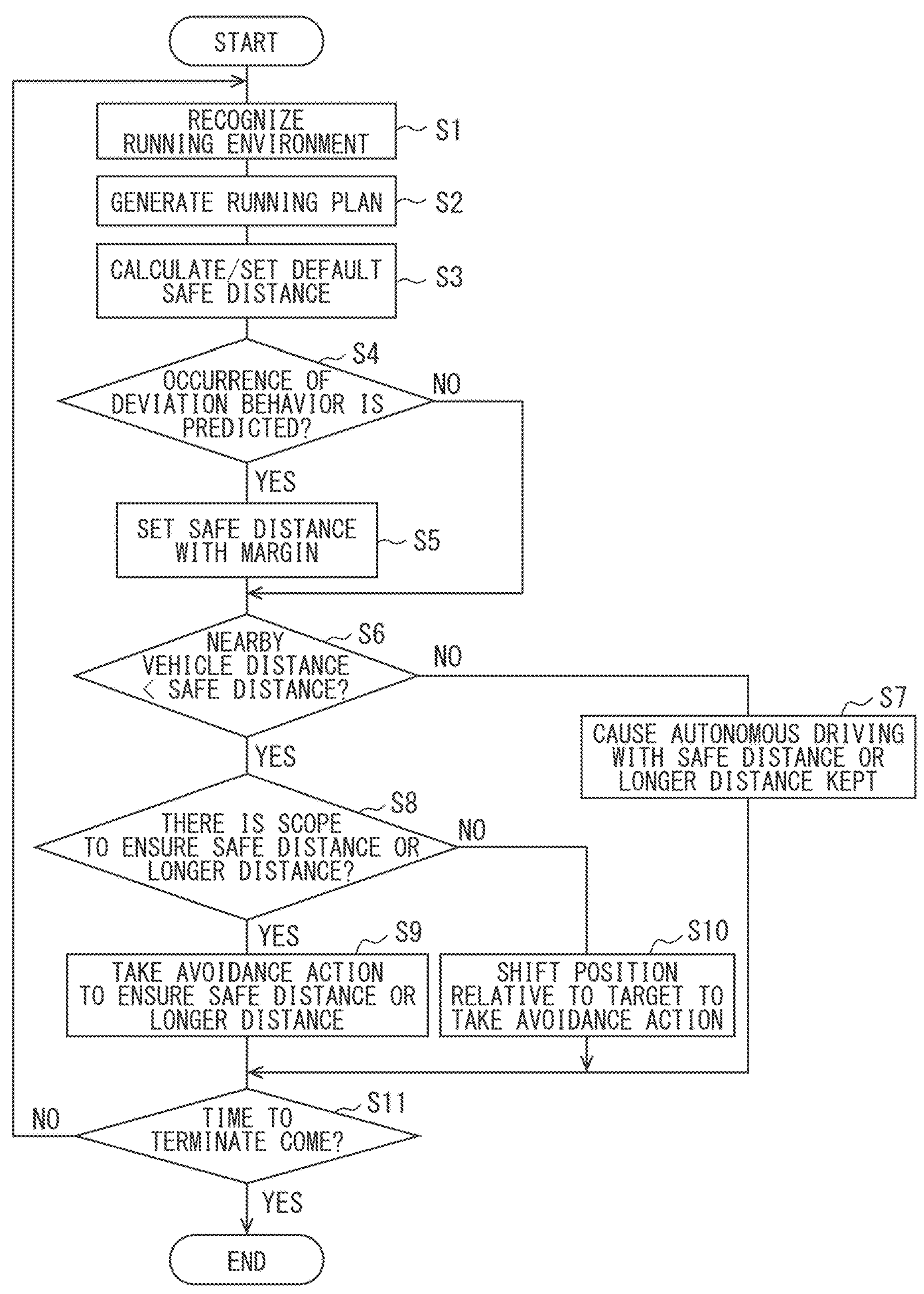
FIG. 7 is a flowchart illustrating autonomous driving-related processing.

A description will be given to an example of a flow of processing (hereafter, referred to as autonomous driving-related processing) related to autonomous driving in the autonomous driving apparatus 2 with reference to the flowchart in FIG. 7. That the steps included in the autonomous driving-related processing are performed by a computer is equivalent to that the autonomous driving method is performed. The flowchart in FIG. 7 can be configured to be started when a switch (hereafter, referred to as power switch) for actuating an internal combustion engine or a motor generator of the subject vehicle is turned on and autonomous driving is started. Or, when the subject vehicle is configured to be switchable between manual driving and autonomous driving, the flowchart in FIG. 7 can be configured to be started when setting of autonomous driving has been established and the power switch is turned on. Alternatively, the flowchart in FIG. 7 may be configured to be started when setting of autonomous driving is switched on during manual driving and the manual driving is switched to the autonomous driving.

At S1, first, the running environment recognition unit 22 recognizes a running environment of the subject vehicle. At S2, the running planning unit 24 generates a running plan for running the subject vehicle by autonomous driving using the running environment recognized at S1. In this example, at least a short-term running plan is generated. At S3, the basis setting unit 251 calculates a safe distance between the subject vehicle and a nearby vehicle using the above-mentioned mathematical expression model and sets the calculated safe distance as a default safe distance.

When the prediction unit 252 predicts an occurrence of a deviation behavior of the subject vehicle or a nearby vehicle at S4 (YES at S4), the processing proceeds to S5. When the prediction unit 252 does not predict an occurrence of a deviation behavior of the subject vehicle or the nearby vehicle (NO at S4), the default safe distance set at S3 is maintained as a safe distance and the processing proceeds to S6. At S5, the adjustment unit 253 sets a distance obtained by adding a margin to the default safe distance set at S3 as a safe distance. This margin can be varied according to various factors about the circumstances under which the subject vehicle is placed.

When the nearby vehicle distance is less than the safe distance at S6 (YES at S6), the processing proceeds to S8. Meanwhile, when the nearby vehicle distance is equal to or longer than the safe distance (NO at S6), the processing proceeds to S7. At S7, the autonomous driving function unit 26 causes autonomous driving in accordance with a running plan outputted from the confirmation unit 25. As a result, autonomous driving is caused with the nearby vehicle distance equal to or longer than the safe distance kept and the processing proceeds to S11.

When there is a scope to make the nearby vehicle distance equal to or longer than the safe distance at S8 (YES at S8), the processing proceeds to S9. Meanwhile, when there is not a scope to make the nearby vehicle distance equal to or longer than the safe distance in the running environment recognized at S1 (NO at S8), the processing proceeds to S10.

At S9, the autonomous driving function unit 26 causes autonomous driving so that the nearby vehicle distance is made equal to or longer than the safe distance and the processing proceeds to S11. At S10, the autonomous driving function unit 26 causes autonomous driving so that positions of a nearby vehicle as a target and the subject vehicle are shifted and the processing proceeds to S11. The nearby vehicle as a target cited here is a nearby vehicle whose nearby vehicle distance is less than a safe distance at S6.

When time to terminate the autonomous driving-related processing has come at S11 (YES at S11), the autonomous driving-related processing is terminated. Meanwhile, when time to terminate the autonomous driving-related processing has not come yet (NO at S11), the processing returns to S1 and is repeated. Examples of time to terminate autonomous driving-related processing include when the power switch of the subject vehicle is turned off, when autonomous driving is switched to manual driving, and the like.

The processing of S8 and S10 may be omitted and the configuration may be so configured that when the judgment at S6 is YES, the processing proceeds to S9. When there is no scope to make a nearby vehicle distance equal to or longer than a safe distance with this configuration, such autonomous driving as to bring the nearby vehicle distance close to the safe distance as much as possible can be caused or any other like measure can be taken.

Summary of First Embodiment

According to the configuration of the first embodiment, with respect to a safe distance used for evaluation of a condition for automatically taking an avoidance action for avoiding approaching of the subject vehicle and a nearby vehicle, the following measure is taken: when an occurrence of a deviation behavior deviating from a behavior in accordance with travel control of the subject vehicle or a nearby vehicle is predicted, a safe distance is increased as compared with when an occurrence of a deviation behavior is not predicted. Thus, when an occurrence of a deviation behavior is predicted, a safe distance is somewhat increased as compared with when an occurrence of a deviation behavior is not predicted. As a result, even when the subject vehicle or a nearby vehicle of the subject vehicle exhibits a behavior deviating from a behavior in accordance with travel control, an avoidance action can be taken with a more allowance. Consequently, during autonomous driving of a vehicle, a distance between the subject vehicle and a nearby vehicle can be more easily prevented from becoming too short.

According to the configuration of the first embodiment, an occurrence of a deviation behavior of the subject vehicle is predicted by detecting a failure in a mechanism related to a behavior of the subject vehicle. Therefore, even when a deviation behavior deviating from a behavior in accordance with travel control of the subject vehicle occurs owing to a failure in a mechanism related to a behavior of the subject vehicle, a distance between the subject vehicle and a nearby vehicle can be more easily prevented from becoming too short.

According to the configuration of the first embodiment, information indicating a failure in a mechanism related to a behavior of the subject vehicle is transmitted to a nearby vehicle. Therefore, the nearby vehicle can predict a deviation behavior deviating from a behavior in accordance with travel control of the subject vehicle and somewhat increase a safe distance. Consequently, also at the nearby vehicle, a distance between the subject vehicle and the nearby vehicle can be more easily prevented from becoming too short.

According to the configuration of the first embodiment, an occurrence of a deviation behavior is predicted based on a divergence between a behavior in accordance with travel control at a nearby vehicle and an actual behavior of the nearby vehicle recognized using an autonomous sensor of the subject vehicle. Therefore, even when a deviation behavior deviating from a behavior in accordance with travel control of the nearby vehicle occurs because of a skid of the nearby vehicle or the like, a distance between the subject vehicle and the nearby vehicle can be more easily prevented from becoming too short.

According to the configuration of the first embodiment, information indicating that an occurrence of a deviation behavior of a first nearby vehicle can be transmitted also to nearby vehicles other than the first nearby vehicle. Thus, even with respect to a vehicle in a position where a marked vehicle whose deviation behavior is difficult to recognize by an autonomous sensor, a deviation behavior deviating from a behavior in accordance with travel control of the marked vehicle can be predicted from the information and a safe distance can be somewhat increased. Therefore, a distance can be more easily prevented from becoming too short also between nearby vehicles.

Second Embodiment

The first embodiment is so configured that when an occurrence of a deviation behavior of a target vehicle is not predicted at the prediction unit 252, a safe distance is not provided with a margin but the present disclosure is not limited thereto. For example, the present disclosure may be so configured that even when an occurrence of a deviation behavior of a target vehicle is not predicted at the prediction unit 252, a default safe distance set at the basis setting unit 251 is provided with a margin (hereafter, referred to as second embodiment). Even in a case where the configuration of the second embodiment is adopted, the following measure is taken when an occurrence of a deviation behavior of a target vehicle is predicted at the prediction unit 252: a safe distance is increased by increasing an amount of a margin given to a default safe distance as compared with when an occurrence of a deviation behavior of a target vehicle is not predicted at the prediction unit 252.

Also, according to the configuration of the second embodiment, when an occurrence of a deviation behavior is predicted, a safe distance is somewhat increased as compared with when an occurrence of a deviation behavior is not predicted. Therefore, as in the first embodiment, during autonomous driving of a vehicle, a distance between the subject vehicle and a nearby vehicle can be more easily prevented from becoming too short.

Third Embodiment

The first embodiment is so configured that when an occurrence of a deviation behavior of a target vehicle is predicted at the prediction unit 252, an amount of a margin added to a default safe distance is varied according to various factors about the circumstances under which the subject vehicle is placed but the present disclosure is not limited thereto. For example, an amount of a margin added to a default safe distance when an occurrence of a deviation behavior of a target vehicle is predicted at the prediction unit 252 may be uniformly fixed regardless of various factors about the circumstances under which the subject vehicle is placed.

Fourth Embodiment

The first embodiment is configured to calculate a default safe distance by a mathematical expression model but the present disclosure is not limited thereto. For example, the present disclosure may be configured to calculate a default safe distance by any other index than a mathematical expression model. For example, the present disclosure may be configured to calculate a safe distance by any other index such as Time to Collision (TTC).

Fifth Embodiment

The first embodiment is so configured that the autonomous driving apparatus 2 and the vehicle control ECU 6 are separated from each other but the present disclosure is not limited thereto. For example, the present disclosure may be so configured that the autonomous driving apparatus 2 takes also the function of the vehicle control ECU 6. Further, the present disclosure may be so configured that the autonomous driving apparatus 2 takes also the function of the locator 3.

Sixth Embodiment

In the description of the first embodiment, a case where a nearby vehicle of the subject vehicle is also an autonomous driving vehicle using the vehicular system 1 but the present disclosure is not limited thereto. For example, a nearby vehicle of the subject vehicle may be an autonomous driving vehicle that does not use the vehicular system 1 or may be a vehicle running by manual driving.

For example, when at the received information acquisition unit 212, information about travel control at a nearby vehicle can be acquired from that nearby vehicle via wireless communication, as in the first embodiment, the information can be used to predict an occurrence of a deviation behavior of the nearby vehicle at the prediction unit 252. When a nearby vehicle is not an autonomous driving vehicle, instead of information about future travel control, information about the present travel control is acquired at the received information acquisition unit 212. Thus, as in the first embodiment, the information can be used to predict an occurrence of a deviation behavior of the nearby vehicle at the prediction unit 252. When information cannot be acquired from a nearby vehicle via wireless communication, an occurrence of a deviation behavior of the subject vehicle can be predicted by detecting a failure in a mechanism related to a behavior of the subject vehicle at the prediction unit 252.

Also, according to the above-mentioned configuration, an occurrence of a deviation behavior of at least either of the subject vehicle or a nearby vehicle can be predicted. Therefore, when an occurrence of a deviation behavior is predicted, a safe distance can be somewhat increased as compared with when an occurrence of a deviation behavior is not predicted. As a result, as in the first embodiment, during autonomous driving of a vehicle, a distance between the subject vehicle and a nearby vehicle can be more easily prevented from becoming too short.

Seventh Embodiment

Figure 8:
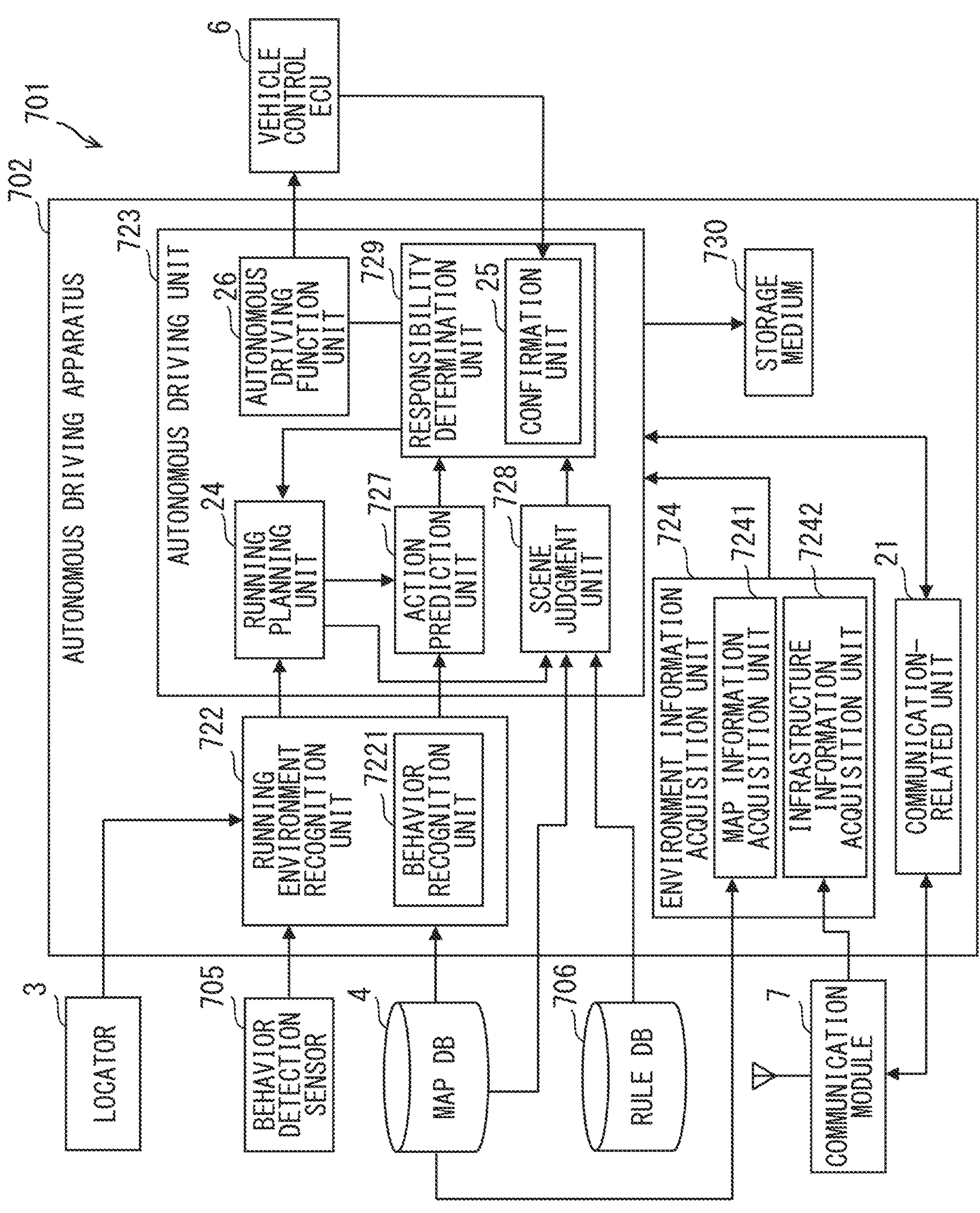
FIG. 8 is a block diagram of a vehicular system 701 in a seventh embodiment.

A description will be given to the seventh embodiment. FIG. 8 is a block diagram of a vehicular system 701 in a seventh embodiment. As configuration elements different from those of the vehicular system 1 in the first embodiment, the vehicular system 701 in the seventh embodiment includes an autonomous driving apparatus 702, a behavior detection sensor 705, and a rule DB storage unit 706.

The behavior detection sensor 705 is a sensor group including a plurality of sensors and includes the periphery monitoring sensor 5 described in relation to the first embodiment and further includes a sensor detecting a behavior of the subject vehicle. With the periphery monitoring sensor 5, a behavior of a moving body present in the vicinity of the subject vehicle and a stationary obstacle present in the vicinity of the subject vehicle can be detected. The sensor detecting a behavior of the subject vehicle includes a sensor detecting speed and acceleration of the subject vehicle and a sensor detecting a direction of movement of the subject vehicle. Also, in the first embodiment, the autonomous driving apparatus 2 may be configured to acquire a detection value from a sensor detecting a behavior of the subject vehicle.

An area taken as the vicinity of the subject vehicle can be defined, for example, as a rectangular area with the subject vehicle at the center, having sides parallel to the front-back direction and the crosswise direction of the subject vehicle. A dimension of the rectangle in the frontward direction of the subject vehicle can be set to approximately a stopping distance of the subject vehicle. A dimension of the rectangle in the rearward direction of the subject vehicle may be set to be identical with the dimension in the frontward direction or may be shorter than that in the frontward direction. A dimension of the rectangle in the crosswise direction of the subject vehicle can be set to a length equivalent to one or several lanes. A size of the peripheral area can be variously set. A shape of the peripheral area can also be variously set. For example, a shape of the peripheral area may be a perfect circle or may be an oval.

The rule DB storage unit 706 is a storage unit holding a rule database (hereafter, referred to as rule DB). The rule DB is a database holding a rule (hereafter, referred to as accident responsibility rule) as a basis for determining responsibility for a potential accident described later. The rule DB stores an accident responsibility rule on a location-by-location basis. The accident responsibility rules for each location include a traffic direction such as one-way traffic, a speed limit, a classification of a priority road and a non-priority road, and the like. Needless to add, the accident responsibility rules include also a rule irrelevant to locations. The accident responsibility rules irrelevant to locations include rules related to correspondence between signal light colors and a running stop, traffic giving a higher priority to pedestrians than to vehicles, and the like.

The autonomous driving apparatus 702 is a device causing autonomous driving of a vehicle and is an example of a vehicle control apparatus. Like the autonomous driving apparatus 2, the autonomous driving apparatus 702 performs an autonomous driving method for causing autonomous driving of the subject vehicle. The autonomous driving method is an example of a vehicle control method.

The autonomous driving apparatus 702 is partly different in configuration from the autonomous driving apparatus 2 provided in the vehicular system 1 in the first embodiment. Like the autonomous driving apparatus 2, the autonomous driving apparatus 702 includes the communication-related unit 21. For the sake of convenience for illustration, a sub-functional block provided in the communication-related unit 21 is omitted in FIG. 8. The autonomous driving apparatus 702 further includes a running environment recognition unit 722, an autonomous driving unit 723, an environment information acquisition unit 724, and a storage medium 730.

The running environment recognition unit 722 is different from the running environment recognition unit 22 in the first embodiment in that a behavior recognition unit 7221 is provided as a sub-functional block in place of the behavior recognition unit 221. The behavior recognition unit 221 in the first embodiment recognizes a behavior of a nearby vehicle. Meanwhile, in addition to a behavior of a nearby vehicle, the behavior recognition unit 7221 recognizes the present behavior of the subject vehicle as well. A behavior of the subject vehicle is determined based on a detection value from a sensor detecting a behavior of the subject vehicle, included in the behavior detection sensor 705. A behavior of the subject vehicle can be expressed, for example, by predetermined indexes including the present speed, acceleration, and yaw rate of the subject vehicle.

The environment information acquisition unit 724 acquires information (hereafter, referred to as environment information) related to an environment in which the subject vehicle is placed, except an obstacle in the vicinity of the subject vehicle. The environment information includes information related to a frequency of an appearance of a moving body on a road, except information about an obstacle in the vicinity of the subject vehicle. Information above an obstacle in the vicinity of the subject vehicle excluded from the environment information means information obtained by detecting an obstacle in the vicinity of the subject vehicle with a sensor provided in the subject vehicle. The environment information acquisition unit 724 includes a map information acquisition unit 7241 and an infrastructure information acquisition unit 7242 as sub-functional blocks.

The map information acquisition unit 7241 acquires map data stored in the map DB 4. Map data acquired by the map information acquisition unit 7241 can include, for example, coordinates of facilities, such as a school and a station, where people gather, a longitudinal inclination of a road, a curvature of a curve, and the like. Map data acquired by the map information acquisition unit 7241 is equivalent to the above-mentioned environment information. The map information acquisition unit 7241 may acquire map data of the vicinity of the subject vehicle depending on a position of the subject vehicle. The map information acquisition unit 7241 preferably acquires map data about a range wider than a detection range of the behavior detection sensor 705.

The infrastructure information acquisition unit 7242 acquires infrastructure information received from a center by the communication module 7. Infrastructure information includes weather information, event information, facility use information, and the like. Infrastructure information acquired at the infrastructure information acquisition unit 7242 is equivalent to the above-mentioned environment information.

Weather information is information such as weather and temperature of each unit zone. A unit zone may be a unit mesh of a map, a unit administrative district, or any other unit zone. Event information is information about a holding of an event, such as a concert, where people gather. Event information can be configured to include a position of an event venue, a date of an event, a time period of an event, and the like. Facility use information is information about use of a facility such as a school and a station. Facility use information can be configured to include a day of the week of utilization, a time period of utilization, and the like. In cases where a facility is a school, a time period from a school attendance time to a school closing time can be taken as a time period of utilization. In cases where a facility is a station, an average number of users for each time period may be included in facility use information.

The contents of environment information include information about a frequency of an appearance of a moving body on a road, in other words, the possibility of a position of a moving body changing from a place that is not a road to a road with the passage of time. Meanwhile, as seen from the above-mentioned concrete example, a change in the contents due to a difference in the timing of environment information acquisition is far less than a time change of a position of a moving body. It can be said that environment information is static information as compared with a time change of a position of a moving body.

In addition to the running planning unit 24, confirmation unit 25, and autonomous driving function unit 26 described in relation to the first embodiment, the autonomous driving unit 723 includes an action prediction unit 727, a scene judgment unit 728, and a responsibility determination unit 729.

The action prediction unit 727 predicts an action of a moving body as the target of prediction. The moving body as the target of prediction is a concept including a vehicle (that is, the subject vehicle) equipped with the vehicular system 701 and at least one moving body present in the vicinity of the subject vehicle. Hereafter, a moving body present in the vicinity of the subject vehicle will be defined as a nearby moving body. Examples of a nearby moving body are the above-mentioned nearby vehicle and pedestrian. The action prediction unit 727 predicts an action of a moving body as the target of prediction for a certain period of time set in advance. The certain period of time is, for example, a time equal to or slightly longer than a time required to run on a candidate route. An action of a moving body as the target of prediction is expressed to include an elapsed time from the present time and a position at that time. An elapsed time expressing an action of a moving body as the target of prediction takes a discrete value with a unit elapsed time taken as one unit. A unit elapsed time is several milliseconds to several tens of milliseconds depending on the performance of equipment.

The action prediction unit 727 acquires a recognition result of the running environment recognition unit 722 to predict an action of a moving body as the target of prediction. Recognition results of the running environment recognition unit 722 include a behavior of a nearby vehicle, a behavior of a moving body other than a nearby vehicle present in the vicinity of the subject vehicle, and a stationary obstacle in the vicinity of the subject vehicle.

In the present embodiment, in addition, the action prediction unit 727 acquires a route calculated as a short-term running plan by the running planning unit 24 as well. In the following embodiments, a route calculated as a short-term running plan by the running planning unit 24 is defined as candidate route. The reason why that route is taken as a "candidate" route is that: a route calculated as a short-term running plan is a candidate of a route used in autonomous driving and may be not used in autonomous driving depending on a determination result at the responsibility determination unit 729. In addition to a position where the subject vehicle runs, a candidate route is expressed to include time of passage through each position on a route. This is because even in an identical position, a distance from a nearby moving body differs when time differs; therefore, even in an identical position, the possibility of an accident differs when time differs.

A description will be given to an action predicted with respect to the subject vehicle as an example of an action of a moving body as the target of prediction predicted by the action prediction unit 727. First, based on a behavior of the subject vehicle at the present time, a position of the subject vehicle located when a unit elapsed time has passed is predicted. Thereafter, it assumed that the vehicle control ECU 6 controls a behavior of the subject vehicle so as to run on a candidate route acquired from the running planning unit 24 and an action of the subject vehicle is predicted. However, when an action of the subject vehicle is predicted, it is also predicted whether the subject vehicle will not be able to run on a candidate route depending on a running environment, for example, since a route must be changed to that for avoiding a nearby moving body or for any other reason.

When a route on which a nearby vehicle is planned to run can be acquired from the received information acquisition unit 212, like the subject vehicle, the nearby vehicle is controlled to run on that route. Based on this assumption, an action of the nearby vehicle is predicted. However, when an action of a nearby vehicle is predicted, it is also determined whether the nearby vehicle can run on a planned route because of an obstacle present in the vicinity of the nearby vehicle.

In case of a moving body as the target of prediction whose planned route cannot be acquired, for example a nearby vehicle, a pedestrian, or the like whose planned route cannot be acquired, an action of the moving body as the target of prediction is predicted based on a traveling speed and a direction of movement of the moving body as the target of prediction at the present time.

Figure 9:
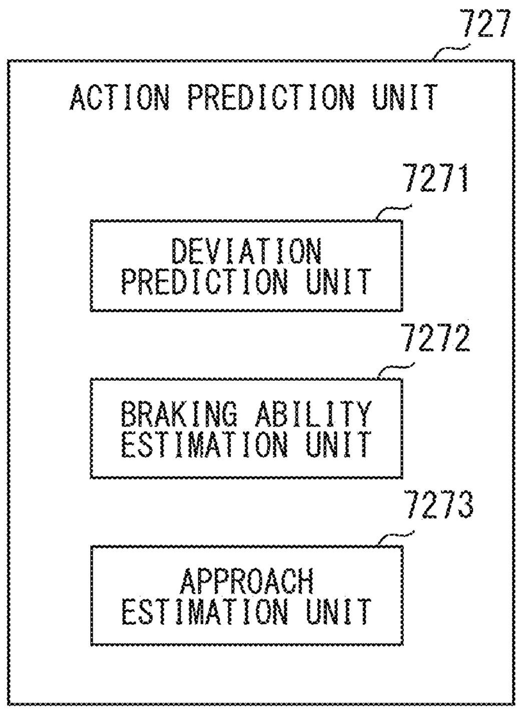
FIG. 9 is a drawing illustrating sub-functional blocks of an action prediction unit 727 in FIG. 8.

The action prediction unit 727 includes also a deviation prediction unit 7271, a braking ability estimation unit 7272, and an approach estimation unit 7273 shown in FIG. 9 as sub-functional blocks. The action prediction unit 727 uses also execution results of these sub-functional blocks to predict an action of a moving body as the target of prediction. FIG. 9 will be described later and a description will be given first to the scene judgment unit 728, the responsibility determination unit 729, and the storage medium 730.

The scene judgment unit 728 acquires an accident responsibility rule in the present position of the subject vehicle position and each position on a candidate route. In other words, the scene judgment unit 728 determines what accident responsibility rule should be adopted in the present position of the subject vehicle and each position on a candidate route.

The accident responsibility rules include accident responsibility rules that differ depending on a location and accident responsibility rules that do not differ depending on a location. An example of accident responsibility rules that differ depending on a location is a relation of priority at crossroads. A relation of priority is determined by a road shape or a road sign. Another example of accident responsibility rules that differ depending on a location is a traffic rule prescribed on a location-by-location basis. An example of traffic rules prescribed on a location-by-location basis is a speed limit. An example of rules irrelevant to a location is a required inter-vehicle distance determined according to a speed.

To acquire an accident responsibility rule differing depending on a location at each spot indicated by a candidate route, the scene judgment unit 728 acquires a candidate route. However, the scene judgment unit 728 need not acquire a candidate route by taking a length of a candidate route into account when acquiring an accident responsibility rule deferring depending on a location.

The responsibility determination unit 729 determines the responsibility of the subject vehicle for a potential accident assumed when the subject vehicle runs on a candidate route based on an action predicted by the action prediction unit 727. To make this determination, the responsibility determination unit 729 acquires an action of a moving body as the target of prediction predicted by the action prediction unit 727 and further acquires an accident responsibility rule acquired by the scene judgment unit 728 from the scene judgment unit 728. Then, the action of the moving body as the target of prediction predicted by the action prediction unit 727 is applied to the accident responsibility rule acquired by the scene judgment unit 728. The responsibility of the subject vehicle for a potential accident assumed when the subject vehicle runs on a candidate route is thereby determined.

This responsibility is determined using, as one index, whether a safe distance described in relation to the first embodiment is ensured between the subject vehicle and an obstacle. Therefore, the responsibility determination unit 729 is configured to include the confirmation unit 25 described in relation to the first embodiment.

The responsibility for a potential accident can be expressed as a value (hereafter, referred to as potential accident responsibility value). When it is assumed that a potential accident responsibility value of the subject vehicle is $\alpha$%, a degree of the responsibility of a nearby moving body between which and the subject vehicle, a potential accident is assumed can also be expressed as such a numeric value as $100-\alpha$(%).

The above-mentioned potential accident responsibility value can be calculated by a preset formula, for example, a mathematical expression model disclosed in WO 2018/115963 A2. The contents described in WO 2018/115963 A2 are incorporated by reference as a description of a technical element of the present specification. Further, a potential accident responsibility value can be determined using a map in which a potential accident responsibility value is determined from actions of the subject vehicle and a nearby moving body predicted by the action prediction unit 727 and an accident responsibility rule. Only the presence/absence of responsibility may be determined without expressing the responsibility for a potential accident as a numeric value or the present disclosure may be so configured that a potential accident responsibility value is compared with a threshold value and as a result, the presence/absence of responsibility is determined.

When it is determined that the responsibility for a potential accident will not accrue to the subject vehicle by the subject vehicle running on a candidate route, the responsibility determination unit 729 instructs, to the autonomous driving function unit 26, that candidate route as a route on which the subject vehicle travels. When the running planning unit 24 outputs only one candidate route and it is determined that the responsibility for a potential accident will accrue to the subject vehicle by the subject vehicle running on that candidate route, the responsibility determination unit 729 instructs the running planning unit 24 to recalculate a candidate route.

When the running planning unit 24 outputs a plurality of candidate routes as a candidate route for running for an identical time period, the responsibility determination unit 729 determines the responsibility of the subject vehicle for a potential accident with respect to each of the candidate routes. When it is determined that the responsibility for a potential accident accrues to the subject vehicle with respect to all of the candidate routes, recalculation of a candidate route is instructed to the running planning unit 24. When it is determined that the responsibility for a potential accident does not accrue to the subject vehicle with respect to two or more candidate routes of the candidate routes, one candidate route is selected based on a predetermined basis. Then, the selected candidate route is outputted to the autonomous driving function unit 26. As the predetermined basis, various bases, for example, a basis most matched with a medium and long-term running plan and a basis involving the least speed change, can be preset. This basis can also be considered as a basis for determining the priority levels of a plurality of candidate routes.

When it is determined that the responsibility for a potential accident accrues to the subject vehicle, the responsibility determination unit 729 can simply prohibit running along the candidate route as the target of determination without instructing the running planning unit 24 to recalculate a candidate route. When running along a candidate route as a target of determination is prohibited, the running planning unit 24 may select whether to recalculate a candidate route or switch autonomous driving to manual driving of a lower level without performing recalculation in response to the prohibition of the candidate route.

The storage medium 730 is writable and nonvolatile and is capable of outputting stored contents to an external device connected to the autonomous driving apparatus 702. The storage medium 730 itself may be removable from the autonomous driving apparatus 702 and insertable to an external device. The storage medium 730 is, for example, a flash memory.

The storage medium 730 stores an action of a moving body as the target of prediction predicted by the action prediction unit 727. By storing an action of a moving body as the target of prediction predicted by the action prediction unit 727 in the storage medium 730, it can be verified later whether the action prediction unit 727 correctly predicted the action of the moving body as the target of prediction.

The storage medium 730 preferably holds a candidate route calculated by the running planning unit 24 together with an action of a moving body as the target of prediction predicted by the action prediction unit 727. Thus, validity of the action of the moving body as the target of prediction predicted by the action prediction unit 727 can be verified with the candidate route taken into account.

Further, the storage medium 730 preferably stores one or more of the following items. One is time correlated to an action of a moving body as the target of prediction predicted by the action prediction unit 727 or a candidate route. Another item is a determination result of the responsibility determination unit 729. In addition, one or more of a behavior recognized by the behavior recognition unit 7221, a detection value of the behavior detection sensor 705, and an accident responsibility rule acquired by the scene judgment unit 728 may be stored in the storage medium 730.

<Sub-Functions of Action Prediction Unit 727>

A description will be given to sub-functions provided in the action prediction unit 727. As shown in FIG. 9, the action prediction unit 727 includes the deviation prediction unit 7271, the braking ability estimation unit 7272, and the approach estimation unit 7273.

The deviation prediction unit 7271 predicts an occurrence of a deviation behavior of the subject vehicle or a nearby vehicle. The prediction unit 252 also predicts an occurrence of a deviation behavior of the subject vehicle or nearby vehicle. The processing performed by the deviation prediction unit 7271 can be identical with that by the prediction unit 252. Therefore, the deviation prediction unit 7271 predicts an occurrence of a deviation behavior of the subject vehicle by detecting a failure in a mechanism related to a behavior of the subject vehicle.

When the deviation prediction unit 7271 predicts an occurrence of a deviation behavior based on a failure in a mechanism related to a behavior of the subject vehicle, the transmission instruction unit 211 is handled the same as when an occurrence of a deviation behavior of a vehicle is predicted by detecting a failure in a mechanism related to a behavior of the subject vehicle at the prediction unit 252. That is, also when the deviation prediction unit 7271 predicts an occurrence of a deviation behavior, the transmission instruction unit 211 transmits information indicating a failure in a mechanism related to a behavior of the subject vehicle to a nearby vehicle via wireless communication.

Therefore, when a nearby vehicle is provided with this vehicular system 701, the received information acquisition unit 212 provided in the vehicular system 701 of the subject vehicle possibly receives the information indicating a failure in a mechanism related to a behavior of the nearby vehicle, transmitted from the nearby vehicle. When the received information acquisition unit 212 receives the information indicating a failure in a mechanism related to a behavior of the nearby vehicle, the action prediction unit 727 predicts an occurrence of a deviation behavior of the nearby vehicle.

It is assumed that there is a nearby vehicle whose divergence between a behavior in accordance with travel control of the nearby vehicle indicated by information acquired at the received information acquisition unit 212 and a behavior recognized at the behavior recognition unit 7221 is equal to or larger than a predetermined value. In this case, like the prediction unit 252, the deviation prediction unit 7271 predicts an occurrence of a deviation behavior of that nearby vehicle.

Also, when an occurrence of a deviation behavior of a nearby vehicle is predicted at the action prediction unit 727, the transmission instruction unit 211 transmits information indicating that an occurrence of a deviation behavior of the nearby vehicle is predicted to a nearby vehicle. When a nearby vehicle is provided with this vehicular system 701, the received information acquisition unit 212 provided in the vehicular system 701 of the subject vehicle possibly acquires information indicating that an occurrence of a deviation behavior of a nearby vehicle of the nearby vehicle, transmitted from the nearby vehicle.

When the received information acquisition unit 212 acquires, from a nearby vehicle, information indicating that an occurrence of a deviation behavior of a nearby vehicle (hereafter, referred to as another vehicle) of that nearby vehicle is predicted, the action prediction unit 727 predicts an occurrence of a deviation behavior of that another vehicle.

Figure 10:
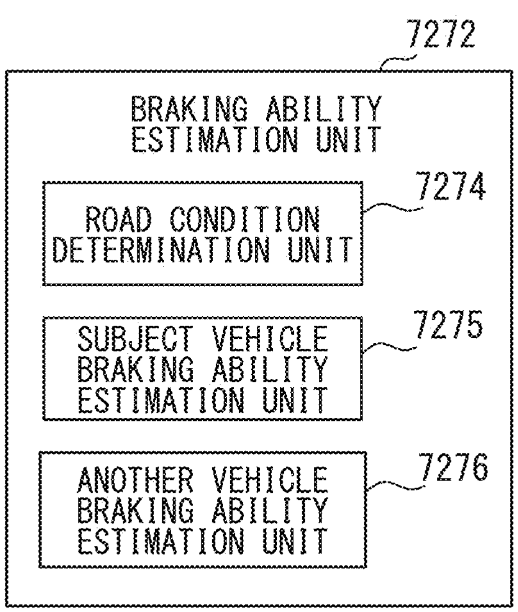
FIG. 10 is a drawing illustrating sub-functional blocks of a braking ability estimation unit 7272 in FIG. 9.

The braking ability estimation unit 7272 estimates the braking abilities of the subject vehicle and another vehicle. Braking ability refers to an ability to decelerate a vehicle. FIG. 10 illustrates sub-functional blocks of the braking ability estimation unit 7272. The braking ability estimation unit 7272 includes a road condition determination unit 7274, a subject vehicle braking ability estimation unit 7275, and an another vehicle braking ability estimation unit 7276.

Figure 11:
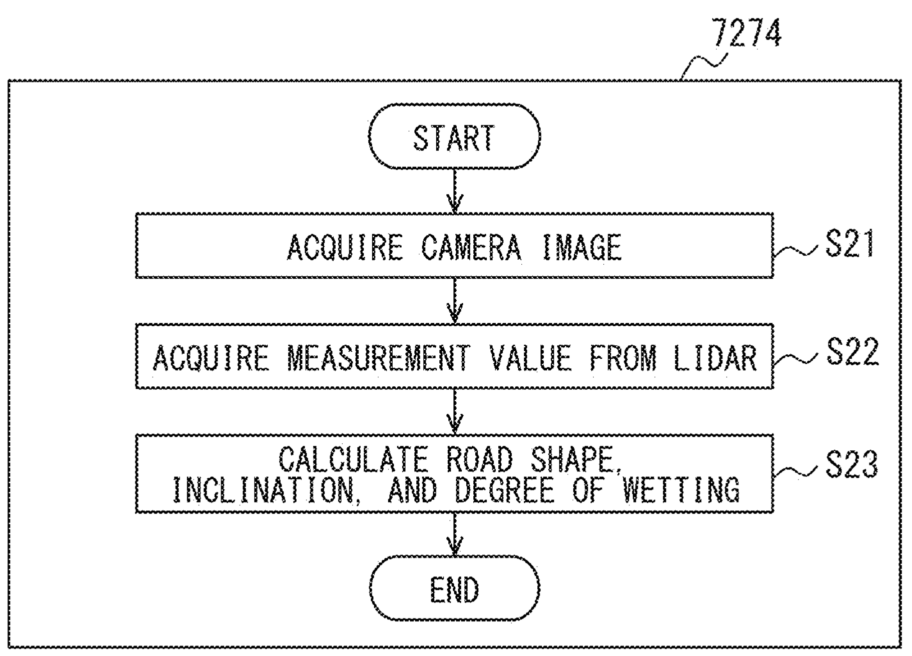
FIG. 11 is a drawing illustrating an example of processing by a road condition determination unit 7274.

The road condition determination unit 7274 successively determines a road condition of a road on which the subject vehicle travels. Road conditions include a road shape, a road inclination, and a degree of road wetting. FIG. 11 illustrates an example of processing by the road condition determination unit 7274. The example shown in FIG. 11 utilizes a camera and Lidar as sensors for determining a road condition. These items are included in the behavior detection sensor 705. During running of the subject vehicle, the road condition determination unit 7274 periodically and repeatedly performs the processing shown in FIG. 11.

At S21, a camera image is acquired. This camera image includes an image of a road on which the subject vehicle is running. At S22, measurement values are acquired from Lidar. At S23, a road shape, a road inclination, and a degree of road wetting are calculated based on the data acquired at S21 and S22. Road shapes include a shape of a road surface in the vertical direction, in other words, road surface roughness. Road surface roughness is preferably detected with such a level of accuracy that a material of a road surface can be discriminated. Examples of road surface materials are asphalt, stone pavement, sand, and the like. With an accuracy allowing these road surface materials to be discriminated, a measurement value of Lidar may enable road surface roughness to be detected. Alternatively, a camera image may be analyzed to determine a road surface material and road surface roughness may be estimated from the determined road surface material.

A road inclination can be determined from either a camera image or a measurement value from Lidar. When the behavior detection sensor 705 includes an inclination sensor, a road inclination may be determined based on a detection value from the inclination sensor.

A degree of road wetting can be determined by analyzing a camera image. A degree of road wetting can also be calculated from a measurement value from Lidar. Or, a degree of road wetting may also be calculated by a combination of a camera image, a measurement value of Lidar, and any other sensor value, that is, sensor fusion. A road shape and a road inclination may also be determined by combining a plurality of types of sensor values.

The description will be back to FIG. 10. The subject vehicle braking ability estimation unit 7275 successively estimates the braking ability of the subject vehicle. As mentioned above, braking ability is an ability to decelerate a vehicle. The braking ability of the subject vehicle is determined based on the ability of a braking device provided in the subject vehicle. However, the braking ability of the subject vehicle is not precisely determined only by the ability of a braking device provided in the subject vehicle.

Even when the braking ability of a braking device is completely identical, a braking distance traveled when a vehicle is decelerated from an identical vehicle speed under different road conditions. Even when the ability of a braking device of the subject vehicle is completely identical, a braking distance traveled when the subject vehicle is decelerated from an identical vehicle speed with different tire performance. Even when the ability of a braking device is completely identical, a braking distance traveled when a vehicle is decelerated from an identical vehicle speed under a different vehicle weight. That is, even when the ability of a braking device is completely identical, the braking ability of the subject vehicle varies. In the present specification, a braking device including a brake pad and the like and a member that is mechanically coupled with the braking device in a vehicle and whose revolution speed is reduced by the braking force of the braking device are collectively designated as brake system device. The braking device is a device actuated when a foot brake is pressed. However, the braking device can also be automatically actuated. A brake system device includes the braking device and tires.

Further, since the braking device involves wear in a brake pad and the like, the ability of the braking device itself varies as well. Consequently, the braking ability of the subject vehicle is successively estimated by the subject vehicle braking ability estimation unit 7275.

In the present embodiment, the braking ability of the subject vehicle is estimated based on a road condition determined by the road condition determination unit 7274. For example, a braking ability estimation map for determining braking ability from a road condition is stored in advance and a road condition determined by the road condition determination unit 7274 and that braking ability estimation map are used to estimate the braking ability of the subject vehicle. A braking ability estimation function for correcting braking ability as a basis with a road condition may be stored in advance and a road condition determined by the road condition determination unit 7274 and that braking ability estimation function may be used to estimate the braking ability of the subject vehicle.

A braking ability estimation map or a braking ability estimation function stored in advance is determined by actually conducting experiment or simulation. A braking ability estimation map or a braking ability estimation function determined by experiment or simulation reflects the characteristics of the brake system device. Therefore, use of the braking ability estimation map or braking ability estimation function is equivalent to estimation of the braking ability of the subject vehicle based on the characteristics of the brake system device provided in the subject vehicle.

In the present embodiment, variation in vehicle weight or variation in the ability of the brake system device is not taken into account in estimation of braking ability. An example in which these items are taken into account to estimate the braking ability of the subject vehicle will be described in relation to a ninth and the following embodiments. Since variation in vehicle weight or variation in the ability of the brake system device is not taken into account in estimation of braking ability in the present embodiment, the present embodiment is inferior in the accuracy of braking ability as compared with when variation in vehicle weight and variation in the ability of the brake system device are taken into account.

Consequently, braking ability may be represented to have such a distribution as normal distribution. For example, the horizontal axis of a distribution indicates braking ability and the vertical axis indicates probability. Braking ability may be represented by a distribution in which the horizontal axis indicates a braking distance at a certain vehicle speed and the vertical axis indicates a probability that a vehicle can stop at that braking distance. In the latter case, a braking distance on the horizontal axis is corrected according to a vehicle speed of the subject vehicle at that time. Thus, a distribution of a probability that a vehicle can stop at a certain braking distance can be obtained based on braking ability.

Unlike the foregoing, braking ability may be one value that does not have a distribution. In this case, a vehicle weight and the ability of the brake system device are considered to have a standard value when estimating braking ability. Or a vehicle weight, the ability of the brake system device, and the like may be set to a worst value that should be generally taken into account in brake control.

The another vehicle braking ability estimation unit 7276 successively estimates the braking ability of a vehicle ahead of the subject vehicle. Since the braking ability of a vehicle ahead of the subject vehicle also varies according to a road condition or the like, the another vehicle braking ability estimation unit 7276 successively estimates the braking ability of the vehicle ahead of the subject vehicle. Vehicles ahead of the subject vehicle include the nearest vehicle ahead running on the same lane as the subject vehicle is. In addition, a vehicle ahead running on a lane adjacent to a lane on which the subject vehicle travels may also be included.

A method for the another vehicle braking ability estimation unit 7276 to estimate the braking ability of a vehicle ahead may be the same as that by the subject vehicle braking ability estimation unit 7275. That is, a braking ability estimation map or a braking ability estimation function is used to successively estimate the braking ability of a vehicle ahead. A braking ability estimation map and a braking ability estimation function used by the another vehicle braking ability estimation unit 7276 may be the same as a map and a function for the subject vehicle or may be dedicated to vehicles ahead. A braking ability estimation map or a braking ability estimation function for vehicles ahead need not be of one kind and may be provided on a car model-by-car model basis.

Further, like the braking ability of the subject vehicle, the braking ability of a vehicle ahead may also be represented to have such a distribution as normal distribution. Unlike the foregoing, the braking ability of a vehicle ahead may also one value that does not have a distribution.

[Order of Processing Up to Estimation of Braking Ability]

Figure 12:
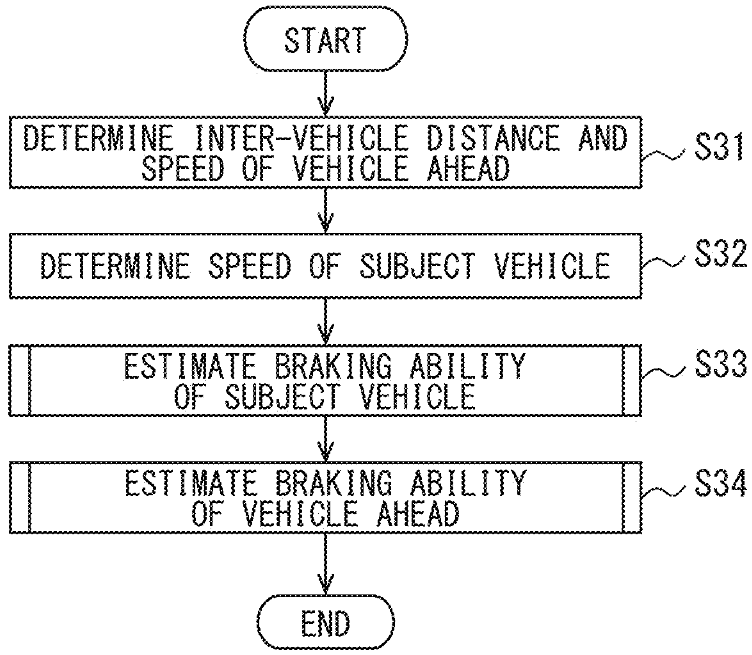
FIG. 12 is a drawing illustrating the order of processing up to estimation of braking ability.

A description will be given to the order of processing up to estimation of braking ability with reference to FIG. 12. During running of the subject vehicle, braking ability is successively estimated. At S31, the behavior recognition unit 7221 determines an inter-vehicle distance between the subject vehicle and a vehicle ahead and a speed of the vehicle ahead. An inter-vehicle distance between the subject vehicle and a vehicle ahead can be detected from a detection value of Lidar or a camera. A speed of a vehicle ahead is determined from a time change in a position of the vehicle ahead. Alternatively, a relative speed of the vehicle ahead to the subject vehicle may be determined from the above-mentioned change in inter-vehicle distance and a speed of the vehicle ahead may be determined from this relative speed and a speed of the subject vehicle described next.

At S32, the behavior recognition unit 7221 determines a speed of the subject vehicle. At S33, the subject vehicle braking ability estimation unit 7275 estimates the braking ability of the subject vehicle. At S34, the another vehicle braking ability estimation unit 7276 estimates the braking ability of the vehicle ahead. Estimation of braking ability is performed by the processing of S40 shown in FIG. 13.

At S41, a road shape is acquired. At S42, a road inclination is acquired. At S43, a degree of road wetting is acquired. As described with reference to FIG. 11, a road shape, a road inclination, and a degree of road wetting are calculated by the road condition determination unit 7274.

At S44, braking ability is estimated from the road shape, road inclination, and degree of road wetting acquired at S41 to S43 and the above-mentioned braking ability estimation map or braking ability estimation function. The braking ability of the subject vehicle can be estimated using a braking ability estimation map or a braking ability estimation function for the subject vehicle. The braking ability of a vehicle ahead can be estimated using a braking ability estimation map or a braking ability estimation function for a vehicle ahead.

The description will be back to FIG. 9. The approach estimation unit 7273 estimates a potential possibility that approaching between the subject vehicle and an obstacle occurs, using environment information acquired at the environment information acquisition unit 724. This possibility can be represented, for example, by probability (hereafter, referred to as potential occurrence probability). The following description will use a potential occurrence probability as a concrete example of the above-mentioned possibility. However, the above-mentioned possibility may be represented by any other representation technique than probability, for example, by levels of high, medium, and low.

A potential occurrence probability may be configured to be limited to a potential occurrence probability of an occurrence of approaching between the subject vehicle and a pedestrian. The approach estimation unit 7273 calculates a potential occurrence probability using environment information based on a correlation between environment information and potential occurrence probability. For example, it is supposed that a potential occurrence probability is increased with increase in possibility P of a pedestrian's dashing out. As shown in A of FIG. 14, it is supposed that a possibility P of a pedestrian's dashing out is increased with reduction in a distance to a spot where more people gather. Therefore, the approach estimation unit 7273 can calculate a potential occurrence probability higher as a vehicle position of the subject vehicle becomes closer to a facility, such as a school, a station, and an event venue, where people gather. A position of a school or a station can be identified from map data acquired at the map information acquisition unit 7241. A position of an event venue can be identified from event information acquired at the infrastructure information acquisition unit 7242. A vehicle position of the subject vehicle can be acquired from the locator 3.

When a factor (hereafter, referred to as target factor) increasing a potential occurrence probability is a spot as mentioned above, a potential occurrence probability can be calculated lower with increase in a distance between the target factor and the subject vehicle. In other words, when environment information used to calculate a potential occurrence probability includes information of a spot as a factor increasing a potential occurrence probability, the approach estimation unit 7273 can calculate a potential occurrence probability lower with increase in a distance between that spot and the subject vehicle.

Figure 14:
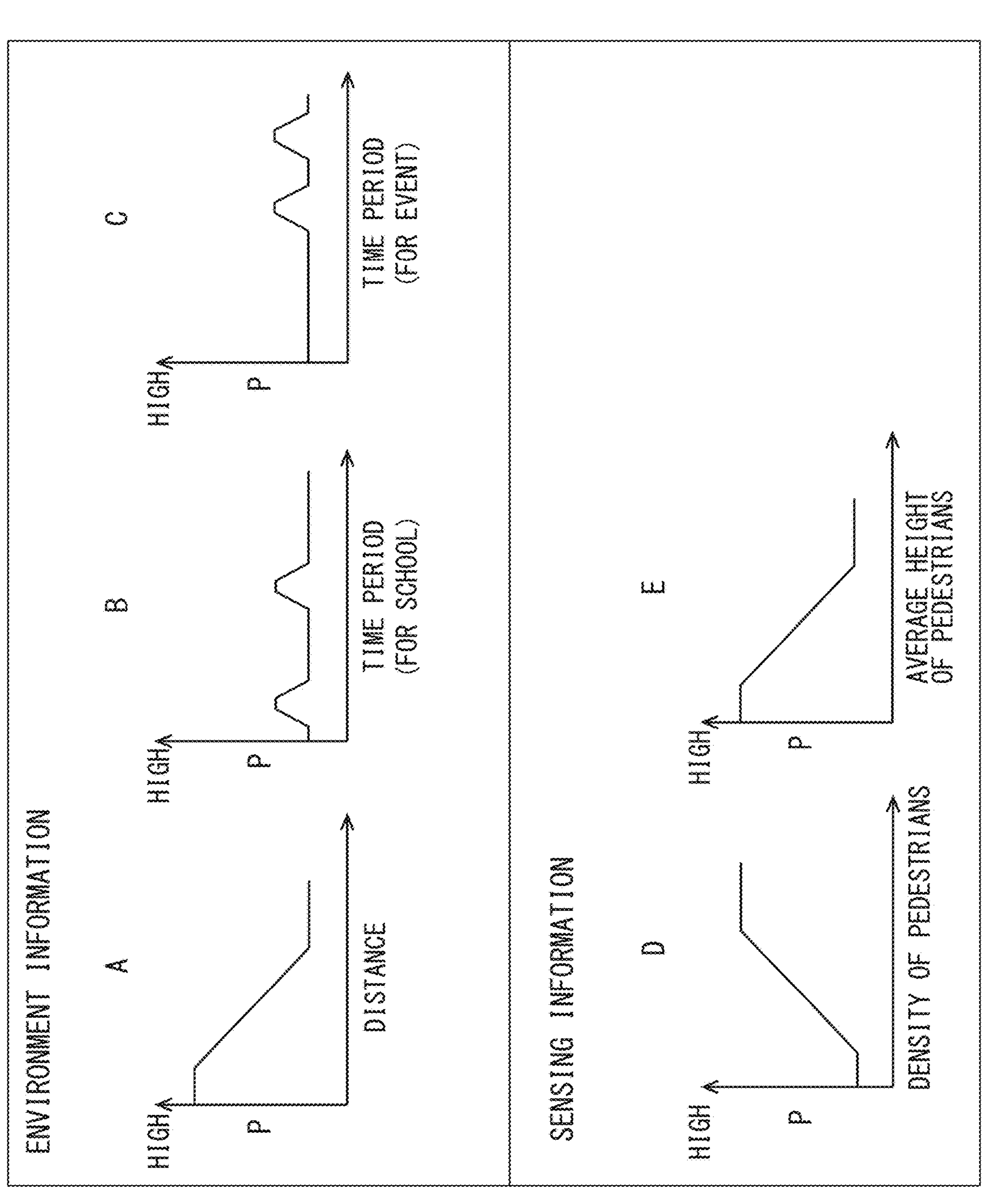
FIG. 14 is a drawing showing a relation between the possibility of a pedestrian's dashing-out and a factor on a factor-by-factor basis.

As shown in B and C of FIG. 14, it is supposed that a potential occurrence probability varies also depending on a time period. An example will be taken. When a target factor is a school, it is supposed that a possibility P of a pedestrian's dashing out peaks twice during a time period from school attendance time to school closing time as shown in B of FIG. 14. When a target factor is an event venue, it is supposed that a possibility P of a pedestrian's dashing out peaks twice before and after a time period of the event as shown in C of FIG. 14. When a target factor is a station, it is supposed that a possibility P of a pedestrian's dashing out varies according to an average number of users for each time period. Therefore, the approach estimation unit 7273 can calculate a potential occurrence probability according to a time period on a target factor-by-target factor basis. An average number of users for each school attendance/closing time and an average number of users of a station for each time period can be identified from facility use information acquired at the infrastructure information acquisition unit 7242. An event closing time can be identified from a time period of the event included in event information acquired at the infrastructure information acquisition unit 7242. When a target factor is a station, it is supposed that a possibility P of dashing out of a moving body other than a pedestrian is also increased during a time period during which an average number of users is larger.

It is supposed that a potential occurrence probability varies also depending on weather. For example, when the weather is snow, it is supposed that a possibility that a moving body cannot stop and dashes out and a braking distance of the subject vehicle is lengthened is increased. Therefore, when the weather is snow, the approach estimation unit 7273 can calculate a higher potential occurrence probability than when the weather is not snow. When the weather is rain, it is supposed that in such a facility as a station, a moving body other than a pedestrian possibly dashes out to take someone to and from the facility and a braking distance of the subject vehicle is lengthened. When the weather is rain, the approach estimation unit 7273 can calculate a higher potential occurrence probability than when the weather is not rain with respect to such a target factor as a station.

It is supposed that a potential occurrence probability varies also depending on temperature. For example, when the temperature is so low that a road surface is frozen, it is supposed that a possibility that a moving body cannot stop and dashes out and a braking distance of the subject vehicle is lengthened is increased. Therefore, when the temperature is lower than a threshold temperature at which it is presumed that a road surface will be frozen, the approach estimation unit 7273 can calculate a higher potential occurrence probability than when the temperature is higher than this threshold temperature.

It is supposed that a potential occurrence probability varies also depending on a location where the subject vehicle runs. For example, it is supposed that there is a higher possibility that a pedestrian or a bicycle dashes out in a more densely crowded area. Therefore, the approach estimation unit 7273 can calculate a higher potential occurrence probability when the subject vehicle runs in a more densely crowded area. For example, areas can be classified into downtown>suburban road>highway in the order of crowdedness. Further, it is supposed that there is a higher possibility that a motorcycle or an automobile on the opposite lane overruns to the subject vehicle's lane on a road with a larger curve curvature. Therefore, the approach estimation unit 7273 can calculate a higher potential occurrence probability as a road on which the subject vehicle is running becomes larger in curve curvature. In addition, it is supposed that a braking distance of the subject vehicle is more lengthened with increase in downward longitudinal inclination. Therefore, the approach estimation unit 7273 can calculate a higher potential occurrence probability with increase in a downward longitudinal inclination of a road on which the subject vehicle is running.

It is supposed that a potential occurrence probability differs also on a lane-by-lane basis on a road having a plurality of lanes on each side. For example, it is supposed that there is a higher possibility of dashing out of a pedestrian or a bicycle on a lane closer to a sidewalk. Therefore, when a road on which the subject vehicle travels is a road having a plurality of lanes on each side, the approach estimation unit 7273 can calculate a higher potential occurrence probability as a lane on which the subject vehicle travels becomes closer to a sidewalk.

The approach estimation unit 7273 may be configured to supplementarily use sensing information detected by the behavior detection sensor 705 as well to calculate a potential occurrence probability. It is supposed that a possibility P of a pedestrian's dashing out varies also depending on a density and an average height of pedestrians as shown in D and E of FIG. 14. A density of pedestrians refers to a number of pedestrians per predetermined range. For example, the approach estimation unit 7273 can calculate a number (that is, density) and/or an average height of pedestrians per sensing range from sensing information of a moving body recognized as a pedestrian at the running environment recognition unit 722 among nearby objects detected at the behavior detection sensor 705.

As shown in D of FIG. 14, for example, it is supposed that a possibility P of a pedestrian's dashing out is increased with increase in density of pedestrians. Further, it is supposed that a possibility of a pedestrian's dashing out is increased as the pedestrian is younger. Therefore, as shown in E of FIG. 14, it is supposed that a possibility P of a pedestrian's dashing out is increased with reduction in average height of pedestrians. Therefore, the approach estimation unit 7273 can calculate a higher potential occurrence probability with increase in density of pedestrians. The approach estimation unit 7273 can calculate a higher potential occurrence probability with reduction in average height of pedestrians.

The approach estimation unit 7273 may totalize a plurality of factors to calculate a potential occurrence probability. FIG. 14 will be taken as an example. When a target factor is a school, the possibilities of dashing out shown in A, B, D, and E of FIG. 14 may be integrated respectively into likelihoods LA, LB, LD, and LE to calculate a potential occurrence probability. For example, likelihood X1 obtained by integrating likelihoods LA and LB is calculated by an equation of $X1=LA\times LB/\{LA\times LB+(1-LA)\times(1-LB)\}$. Subsequently, likelihood X2 obtained by integrating likelihoods X1 and LD is calculated by an equation of $X2=X1\times LD/\{X1\times LD+(1-X1)\times(1-LD)\}$. Lastly, likelihood X3 obtained by integrating likelihoods X2 and LE is calculated by an equation of $X3=X2\times LE/\{X2\times LE+(1-X2)\times(1-LE)\}$. The thus obtained likelihood X3 is taken as a potential occurrence probability obtained by integrating likelihoods of A, B, D, and E. A combination of factors to be integrated is not limited to the above-mentioned example.

The description will be back to FIG. 9. The action prediction unit 727 including the deviation prediction unit 7271, the braking ability estimation unit 7272, and the approach estimation unit 7273 as sub-functions takes processing results of the sub-functions as well to predict an action of a moving body as the target of prediction.

When the deviation prediction unit 7271 predicts a deviation behavior of at least either the subject vehicle or a nearby vehicle, an action of the moving body as the target of prediction taken when a deviation behavior occurs is predicted. As mentioned above, moving bodies as the target of prediction include the subject vehicle and a nearby moving body.

When the subject vehicle is a moving body as the target of prediction and a deviation behavior of the subject vehicle is predicted, what behavior the subject vehicle will make due to the deviation behavior is predicted. In cases where the subject vehicle is a moving body as the target of prediction and a deviation of a nearby vehicle is predicted, when the nearby vehicle makes a deviation behavior, what behavior of the subject vehicle will be required to avoid approaching between the subject vehicle and that nearby vehicle is predicted.

A description will be given to a case where a moving body as the target of prediction is a nearby moving body. When a deviation behavior of a nearby vehicle is predicted, the nearby vehicle whose deviation behavior is predicted is taken as a moving body as the target of prediction and an action of the nearby vehicle taken when the deviation behavior is made is predicted. Further, how a moving body (vehicle, person, or the like) present in proximity to the nearby vehicle whose deviation behavior is predicted makes an action under the influence of the nearby vehicle making the deviation behavior is predicted. Since the action prediction unit 727 includes the braking ability estimation unit 7272 as a sub-function, the action prediction unit predicts an action of a vehicle whose braking ability is estimated based on the braking ability estimated by the braking ability estimation unit 7272 regardless of whether to predict a deviation behavior. A vehicle whose braking ability is estimated is specifically the subject vehicle and a vehicle ahead. When a distance between the subject vehicle and a nearby moving body becomes shorter and it is predicted that deceleration will be required, the subject vehicle is predicted to decelerate according to the estimated braking ability. Further, an inter-vehicle distance and a speed at start of deceleration are also changed according to the estimated braking ability to predict an action of the subject vehicle. Also, with respect to a vehicle ahead, when deceleration will be required because a distance to an obstacle present in the vicinity of the vehicle ahead or for any other reason, an inter-vehicle distance and a speed at start of deceleration and speed change after start of deceleration are predicted according to the estimated braking ability. Further, actions of the subject vehicle and the vehicle ahead predicted based on the estimated braking ability are taken into account and an action of a moving body present in the vicinity of the subject vehicle and the vehicle ahead is predicted.

The action prediction unit 727 further includes the approach estimation unit 7273 as a sub-function. The approach estimation unit 7273 estimates a potential possibility that approaching between the subject vehicle and an obstacle occurs. The action prediction unit 727 predicts an action of a moving body as the target of prediction with the above-mentioned possibility estimated by the approach estimation unit 7273 taken into account. For example, with respect to the subject vehicle as a moving body as the target of prediction, it is predicted that the subject vehicle makes an action of limiting a speed more with increase in the above-mentioned possibility. It may be predicted that the subject vehicle lengthens an inter-vehicle distance more with increase in potential occurrence probability.

The action prediction unit 727 can also predict an action of a moving body as the target of prediction with a probability distribution. An example of a probability distribution is a probability distribution of a position where a moving body as the target of prediction is present at each time of day when an action of the moving body as the target of prediction is predicted. An action of a moving body as the target of prediction with a wider probability distribution may be predicted with increase in the above-mentioned possibility. Also, when a moving body as the target of prediction is a nearby vehicle, a prediction may be made as for the subject vehicle. That is, it may be predicted that a speed is limited more, an inter-vehicle distance is lengthened more, or a probability distribution is widened more with increase in the above-mentioned possibility.

Summary of Seventh Embodiment

The vehicular system 701 in the seventh embodiment includes the responsibility determination unit 729 that determines the responsibility for a potential accident assumed when the subject vehicle runs on a candidate route. Therefore, if the subject vehicle runs on a candidate route and an accident occurs, whether the responsibility for that accident accrues to the subject vehicle can be determined in advance. When the subject vehicle is caused to run on a candidate route by autonomous driving control at such a level that the autonomous driving apparatus 702 is supposed to pursue the responsibility for an accident, whether the responsibility for an accident should accrue to the autonomous driving apparatus 702 can be determined in advance.

The action prediction unit 727 provided in the autonomous driving apparatus 702 includes the deviation prediction unit 7271. The deviation prediction unit 7271 predicts an occurrence of a deviation behavior of the subject vehicle or a nearby vehicle. When the deviation prediction unit 7271 predicts that the subject vehicle or a nearby vehicle will deviate from a behavior in accordance with travel control, the action prediction unit 727 predicts, as an action of the moving body as the target of prediction, an action of the moving body as the target of prediction taken when the above-mentioned deviation behavior occurs. Since an action of a moving body as the target of prediction taken when a deviation behavior occurs is also predicted, the reliability of prediction is enhanced. Therefore, various dangers that can occur during running of the subject vehicle are easily reduced.

The action prediction unit 727 includes the braking ability estimation unit 7272 as a sub-function. Provided with this configuration, the action prediction unit 727 not only takes a deviation behavior of the subject vehicle or a nearby vehicle. The action prediction unit also successively estimates the braking ability of the subject vehicle and a vehicle ahead and predicts actions of the subject vehicle and the vehicle ahead based on the estimated braking ability. Also, according to the foregoing, the reliability of prediction of an action of a moving body present in the vicinity of the subject vehicle and a vehicle ahead is enhanced.

The action prediction unit 727 further includes the approach estimation unit 7273 as a sub-function. Provided with this configuration, the action prediction unit 727 can predict an action of a moving body as the target of prediction such as the subject vehicle with the potential possibility of approaching between the subject vehicle and an obstacle determined from environment information, taken into account. Also, according to the foregoing, the reliability of prediction of an action of a moving body as the target of prediction is enhanced.

In the seventh embodiment, an action of a moving body as the target of prediction taken when a deviation behavior occur is predicted in action prediction. As a result, a potential accident difficult to find without a deviation behavior taken into account can be extracted as a target of responsibility determination. An example of a potential accident difficult to find without a deviation behavior taken into account is an accident that never occur during a normal behavior or an accident whose probability of occurrence is very low during a normal behavior, for example, an accident in which that the subject vehicle suddenly cuts its way and crashes into a nearby vehicle running parallel to the subject vehicle. With respect to the thus extracted potential accident, the responsibility determination unit 729 determines responsibility. When it is determined that the responsibility for the potential accident accrues to the subject vehicle, adoption of a candidate route that can cause the potential accident is aborted. Thus, an occurrence of an accident the responsibility for which accrues to the subject vehicle can be suppressed.

Eighth Embodiment

Figure 15:
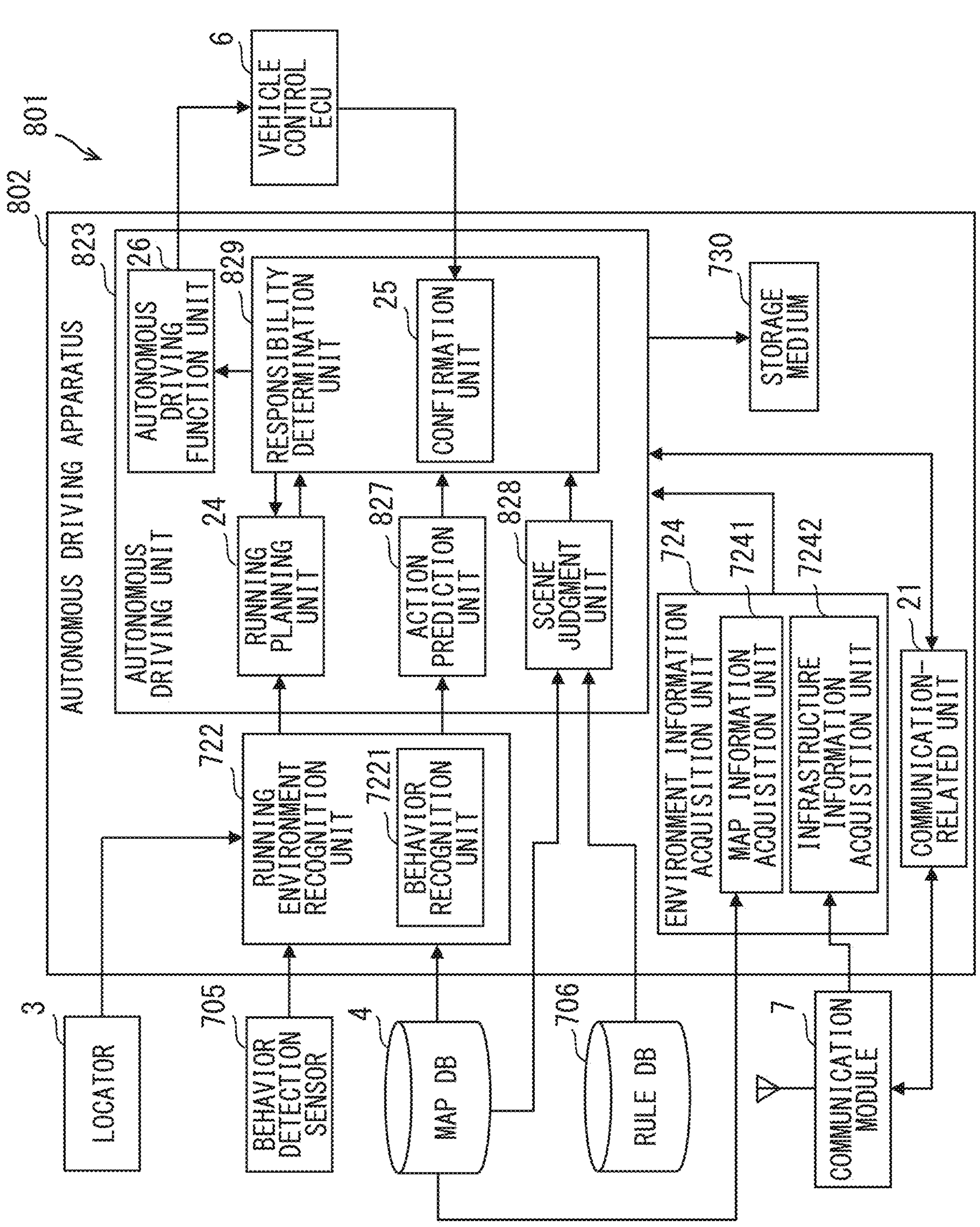
FIG. 15 is a block diagram of a vehicular system 801 in an eighth embodiment.

A description will be given to the eighth embodiment. FIG. 15 shows a block diagram of a vehicular system 801 in the eighth embodiment. The vehicular system 801 in the eighth embodiment is different from the autonomous driving unit 723 in the seventh embodiment in the configuration of an autonomous driving unit 823 of the configuration elements of an autonomous driving apparatus 802.

Like the autonomous driving unit 723 in the seventh embodiment, the autonomous driving unit 823 includes the running planning unit 24. The autonomous driving unit 823 further includes an action prediction unit 827, a scene judgment unit 828, and a responsibility determination unit 829.

The running planning unit 24 calculates a candidate route like the running planning unit 24 in the seventh embodiment. In the seventh embodiment, however, a candidate route is inputted to the action prediction unit 727 and the scene judgment unit 728. In the eighth embodiment, meanwhile, a candidate route is not inputted to the action prediction unit 827 or the scene judgment unit 828 but is inputted to the responsibility determination unit 829.

The action prediction unit 827 acquires a running environment recognized by the running environment recognition unit 722 but does not acquire a candidate route and predicts an action of a moving body as the target of prediction. Therefore, an action of a moving body as the target of prediction is predicted from behaviors of the subject vehicle, a nearby vehicle, and other moving bodies at the present point of time. For example, with respect to the subject vehicle and a nearby vehicle, a future speed is predicted based on a speed and an accelerated speed at the present point of time and a future traveling direction is predicted with a steering angle at the present point of time assumed to be maintained. In addition, various running environments recognized at the running environment recognition unit 722 are taken into account to predict an action of a moving body as the target of prediction. Examples of actions predicted with environment information taken into account are a case where a stop or deceleration is predicted because of a color of a signal light, a case where the subject vehicle is predicted to decelerate because of the presence of a vehicle ahead, a case where a road is curved and a traveling direction is changed along the road, and other like cases. A time when the action prediction unit 827 predicts an action of a moving body as the target of prediction is the same as a time when the action prediction unit 727 in the seventh embodiment does.

The scene judgment unit 828 also acquires a running environment recognized by the running environment recognition unit 722 but does not acquire a candidate route. The scene judgment unit 828 acquires the present position of the subject vehicle and an accident responsibility rule for the vicinity of the present position of the subject vehicle. The vicinity of a position of the subject vehicle has a width including a range within which in accordance with an action of a moving body as the target of prediction predicted by the action prediction unit 827, that moving body as the target of prediction can make an action.

The responsibility determination unit 829 acquires: a candidate route calculated by the running planning unit 24; an action of a moving body as the target of prediction predicted by the action prediction unit 827; and an accident responsibility rule acquired by the scene judgment unit 828. Referring to the action of the moving body as the target of prediction predicted by the action prediction unit 827, the responsibility determination unit 829 determines an action of the moving body as the target of prediction including the subject vehicle taken when the subject vehicle runs on a candidate route. Further, the responsibility determination unit applies the determined action to the accident responsibility rule acquired from the scene judgment unit 828 and thereby determines the responsibility of the subject vehicle for a potential accident assumed when the subject vehicle runs on the candidate route.

Summary of Eighth Embodiment

In the eighth embodiment, while the responsibility determination unit 829 acquires a candidate route, the action prediction unit 827 predicts an action of a moving body as the target of prediction without acquiring a candidate route. Also, according to the foregoing, as with the responsibility determination unit 729 in the seventh embodiment, the responsibility of the subject vehicle for a potential accident assumed when the subject vehicle runs on a candidate route can be determined.

In addition, with the configuration of the eighth embodiment, when an accident occurs and then verification becomes necessary for the accident, whether a candidate route involves a problem or an action predicted by the action prediction unit 827 is inaccurate can be easily verified.

Ninth Embodiment

Figure 16:
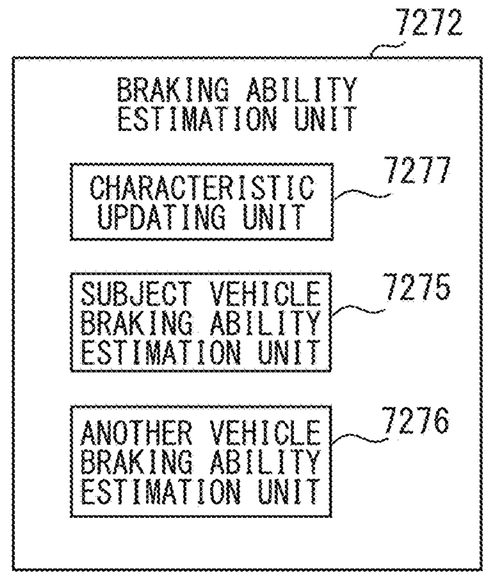
FIG. 16 is a block diagram of a braking ability estimation unit 7272 in a ninth embodiment.

A description will be given to the ninth embodiment. In the ninth embodiment, as shown in FIG. 16, the braking ability estimation unit 7272 includes a characteristic updating unit 7277, a subject vehicle braking ability estimation unit 7275, and an another vehicle braking ability estimation unit 7276.

The characteristic updating unit 7277 successively updates the characteristics of a brake influencing factor in the subject vehicle. Specifically, a condition of a tire, a vehicle weight, a condition of wear in a brake pad are successively updated. A condition of a tire in the present embodiment refers to a condition of wear in a tire. With respect to the behavior detection sensor 705, a camera may be installed at the lower part of a mirror or the like to pick up an image of the periphery of a vehicle that is prone to be a blind spot of a driver. A coverage of a camera for picking up an image of the periphery of a vehicle may embrace a tire. In this case, a condition of wear in the tire can be estimated by analyzing a camera image. Further, a condition of wear in a tire may be estimated from variation in relation between an operation decelerating the subject vehicle and a decelerated speed, including an amount of brake pedal depression, a brake oil pressure, and the like.

A vehicle weight can be measured from variation from a reference weight by installing a load sensor on a suspension. A reference weight is a weight determined according to a motor vehicle type of each vehicle. A condition of wear in a brake pad can be estimated by a mileage from replacement of the brake pad. Or, a sensor detecting a condition of wear in a brake pad may be provided and a condition of wear in the brake pad may be estimated from a detection value of that sensor. Variation in relation between an operation decelerating the subject vehicle and a decelerated speed is influenced not only by a condition of wear in a tire but also by a condition of wear in a brake pad. Consequently, a condition of wear in a tire together with a condition of wear in a brake pad may be estimated from variation in relation between an operation decelerating the subject vehicle and a decelerated speed.

A frequency with which the characteristic updating unit 7277 updates these characteristics, that is, a condition of wear in a tire, a condition of wear in a brake pad, and a vehicle weight, may be, for example, every one run. One run refers to a run from ignition-on to ignition-off. These characteristics estimated by the characteristic updating unit 7277 are written over characteristics stored in a predetermined storage unit and stored there.

Figure 17:
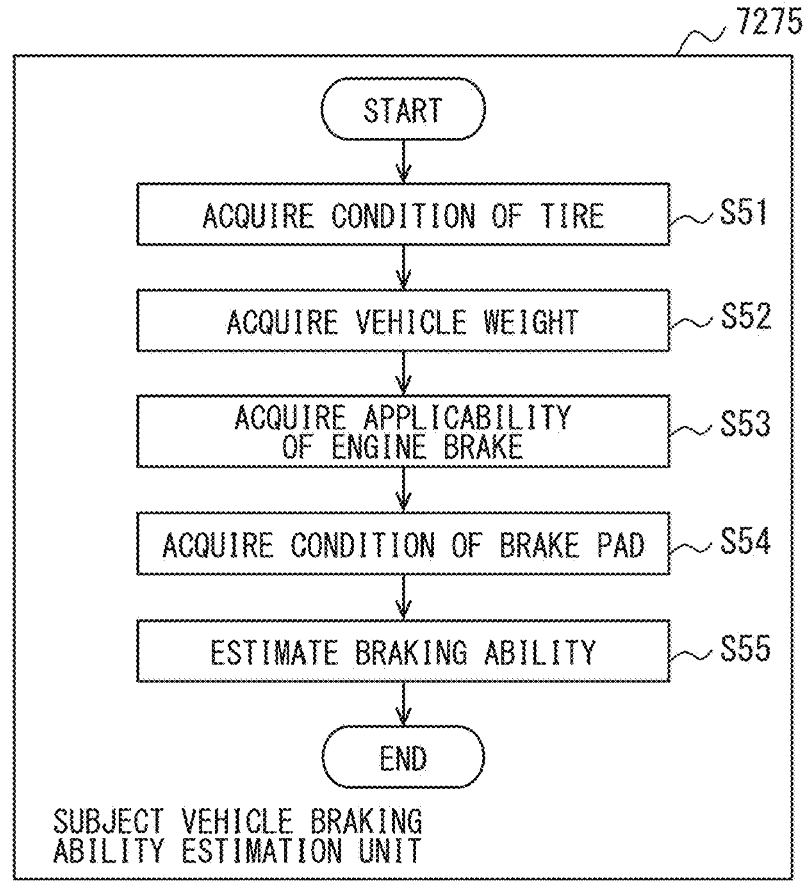
FIG. 17 is a drawing showing processing performed by a subject vehicle braking ability estimation unit 7275 in the ninth embodiment.

FIG. 17 illustrates processing performed by the subject vehicle braking ability estimation unit 7275 in the ninth embodiment. At S51, a condition of wear in a tire of the subject vehicle is acquired from the characteristic updating unit 7277. At S52, a vehicle weight of the subject vehicle is acquired. At S53, the applicability of an engine brake is acquired. When a driving force source of the subject vehicle is a motor only and the subject vehicle is not mounted with an engine, an engine brake cannot be applied. When a brake is applied, the accelerator is turned off. Therefore, when the subject vehicle is mounted with an engine as a driving force source, an engine brake is applicable. At S53, information for determining whether higher braking force can be generated by an engine brake is acquired. When a gear ratio can be increased at the time of accelerator-off, braking force by an engine brake can be made larger than when a gear ratio is not changed. At S53, consequently, information indicating whether an engine is mounted as a driving force source and a gear ratio can be changed by a control device is acquired.

When a gear ratio can be increased to apply an engine brake at the time of braking, braking ability is enhanced. In the following description, that a gear ratio is increased to apply an engine brake at the time of braking will be simply referred to as that an engine brake is applicable. When an engine brake is applicable, braking ability is enhanced. Therefore, whether an engine brake is applicable is a characteristic as a brake influencing factor that has an influence on braking ability.

At S54, a condition of wear in a brake pad is acquired. A condition of wear in a tire, a vehicle weight, and a condition of a brake pad also have an influence on braking ability. Therefore, a condition of wear in a tire, a vehicle weight, and a condition of a brake pad are also characteristics as brake influencing factors.

At S55, the braking ability of the subject vehicle is estimated based on the information acquired at S51 to S54. To estimate the braking ability of the subject vehicle, as in the seventh embodiment, a braking ability estimation map or a braking ability estimation function with which braking ability can be estimated from information acquired at S51 to S54 is stored in advance. The braking ability of the subject vehicle is estimated based on the braking ability estimation map or the braking ability estimation function and the information acquired at S51 to S54. Also, in the ninth embodiment, the braking ability of the subject vehicle may have such a distribution as normal distribution.

The above-mentioned braking ability estimation map or braking ability estimation function estimates braking ability higher when an engine brake is applicable than when an engine brake is unavailable. An example of to what extent the applicability of an engine brake varies braking ability will be described below: For example, in cases where braking ability has a distribution, when an engine brake is applicable, the center value of the distribution is changed to the higher side of braking ability by a preset certain value than when an engine brake is unavailable.

Figure 18:
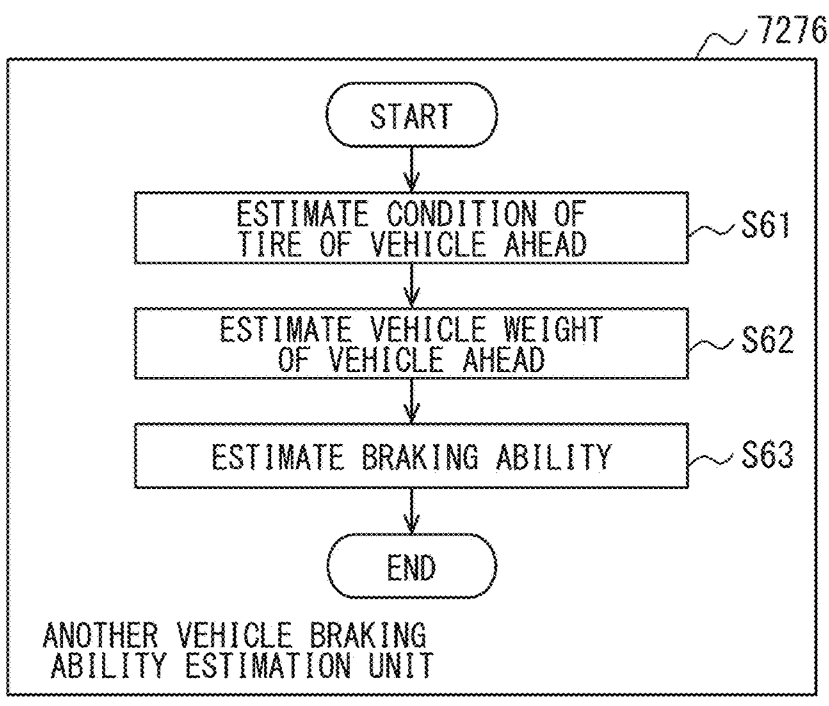
FIG. 18 is a drawing showing processing performed by an another vehicle braking ability estimation unit 7276 in the ninth embodiment.

FIG. 18 illustrates processing performed by the another vehicle braking ability estimation unit 7276 in the ninth embodiment. At S61, a condition of wear in a tire of a vehicle ahead is estimated. For example, when a vehicle ahead is at a stop and an image of a tire of the vehicle ahead can be picked up with a front camera provided in the subject vehicle, a condition of wear in the tire of the vehicle ahead can be estimated.

At S62, a vehicle weight of the vehicle ahead is estimated. With respect to a vehicle weight of a vehicle ahead, when an image of the vehicle ahead can be picked up with a camera, a standard vehicle weight of a car model or a motor vehicle type of the vehicle ahead can be acquired based on the car model or motor vehicle type of the vehicle ahead. A number of occupants of the vehicle ahead is estimated from an image of the vehicle ahead picked up with a camera. A total weight of the occupants is estimated by multiplying the number of the occupants by a standard weight per person. Then, a value obtained by adding the standard vehicle weight and the total weight of the occupants is estimated as vehicle weight. A condition of wear in a tire and a vehicle weight of a vehicle ahead can be estimated every one run and each time a vehicle ahead is changed to a different vehicle.

At S63, the braking ability of the vehicle ahead is estimated based on the values acquired at S61 and S62. To estimate the braking ability of a vehicle ahead, as in the seventh embodiment, a braking ability estimation map or a braking ability estimation function with which braking ability can be estimated from information acquired at S61 and S62 is stored in advance. With respect to a vehicle ahead, a condition of a brake pad is not acquired. Further, the braking ability estimation map or braking ability estimation function is configured to allow the braking ability of a vehicle ahead to be estimated without necessity for a condition of wear in a brake pad of the vehicle ahead. This is because a condition of wear in a brake pad of a vehicle ahead is difficult to estimate.

Also, in the ninth embodiment, the braking ability of a vehicle ahead may have such a distribution as normal distribution. Unlike for the subject vehicle, a condition of wear in a brake pad is not taken into account. Therefore, when the braking ability of a vehicle ahead is provided with a distribution, this distribution may be made wider than the distribution of the braking ability of the subject vehicle.

Summary of Ninth Embodiment

The braking ability of the subject vehicle varies depending on a brake influencing factor of the subject vehicle. Some brake influencing factors of the subject vehicle, including a condition of wear in a tire, a vehicle weight, a condition of wear in a brake pad, and the like, change with time. In the ninth embodiment, consequently, the characteristic updating unit 7277 successively updates a condition of wear in a tire, a vehicle weight, and a condition of wear in a brake pad of the subject vehicle. The subject vehicle braking ability estimation unit 7275 successively estimates the braking ability of the subject vehicle based on a condition of wear in a tire, a vehicle weight, and a condition of wear in a brake pad of the subject vehicle. Therefore, the braking ability of the subject vehicle can be estimated with accuracy.

The braking ability of the subject vehicle varies also depending on the presence/absence of an engine brake. Consequently, the subject vehicle braking ability estimation unit 7275 in the ninth embodiment acquires the applicability of an engine brake of the subject vehicle as well. When an engine brake is applicable, braking ability is estimated higher than when an engine brake is unavailable. In the ninth embodiment, the applicability of an engine brake is also taken into account to estimate braking ability as mentioned above; therefore, the braking ability of the subject vehicle can be estimated with accuracy.

In the present embodiment, a condition of wear in a tire and a vehicle weight of a vehicle ahead, which are examples of characteristics as brake influencing factors, are also successively estimated. A condition of wear in a tire and a vehicle weight of a vehicle ahead are taken into account to estimate the braking ability of the vehicle ahead. Then, a safe distance between the vehicle ahead and the subject vehicle is successively determined from the braking ability of the subject vehicle and the braking ability of the vehicle ahead successively estimated with the characteristics as brake influencing factors of the subject vehicle and the vehicle ahead taken into account. Therefore, the reliability of a safe distance is enhanced as well.

Tenth Embodiment

Figure 19:
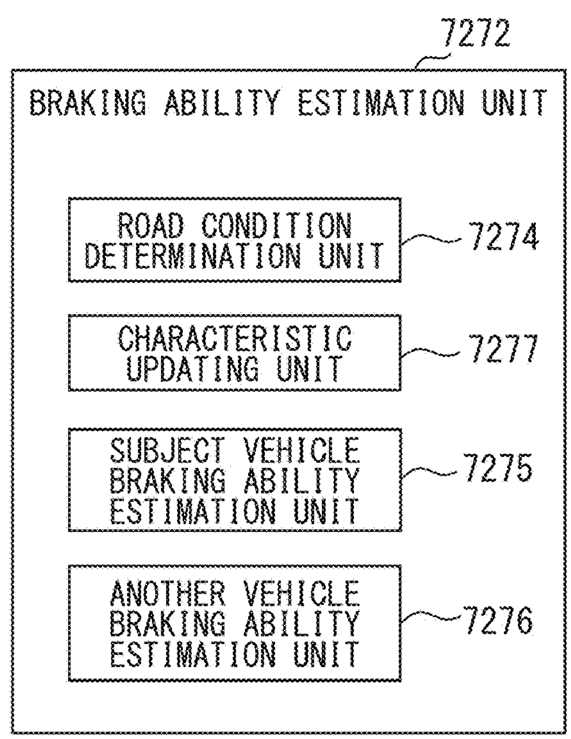
FIG. 19 is a block diagram of a braking ability estimation unit 7272 in a tenth embodiment.

A description will be given to the tenth embodiment. In the tenth embodiment, as shown in FIG. 19, the braking ability estimation unit 7272 includes the road condition determination unit 7274 and characteristic updating unit 7277 described up to this point. In tenth embodiment, the subject vehicle braking ability estimation unit 7275 and the another vehicle braking ability estimation unit 7276 estimate braking ability using calculation results of the road condition determination unit 7274 and the characteristic updating unit 7277.

Figure 13:
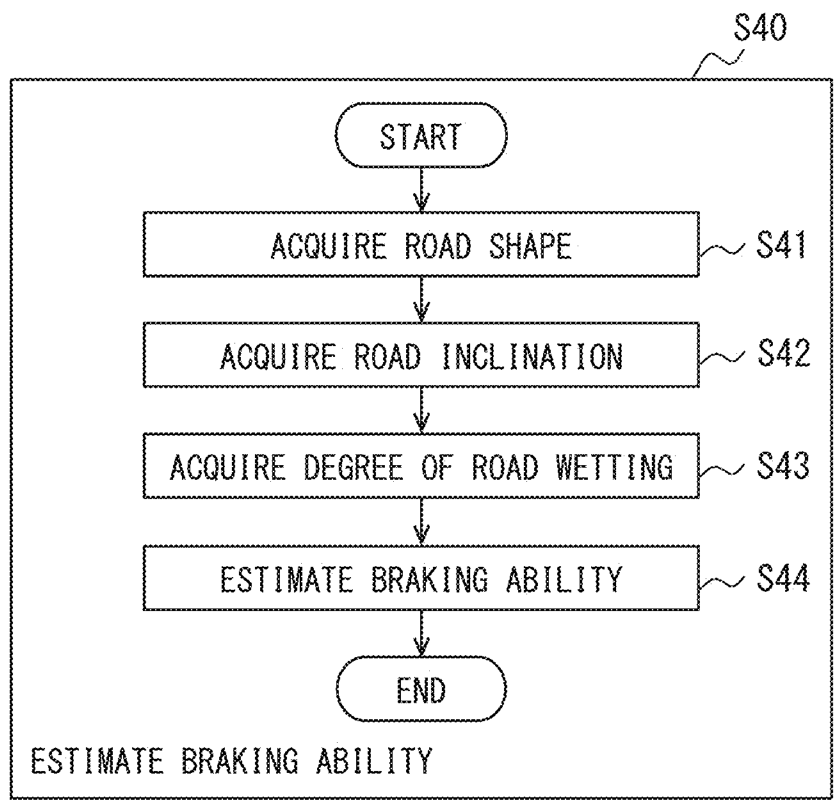
FIG. 13 is a drawing illustrating braking ability estimation processing in the seventh embodiment.
Figure 20:
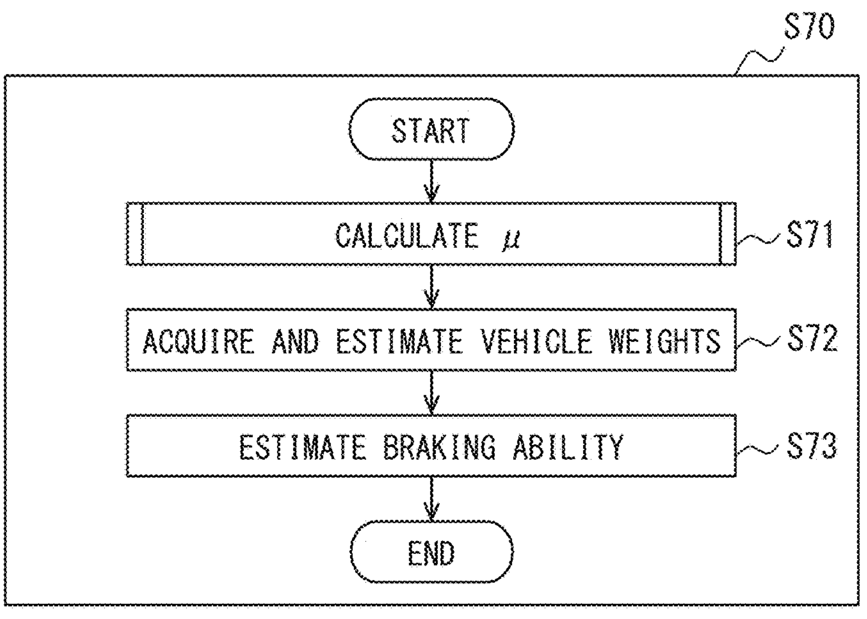
FIG. 20 is a drawing illustrating braking ability estimation processing in the tenth embodiment.
Figure 21:
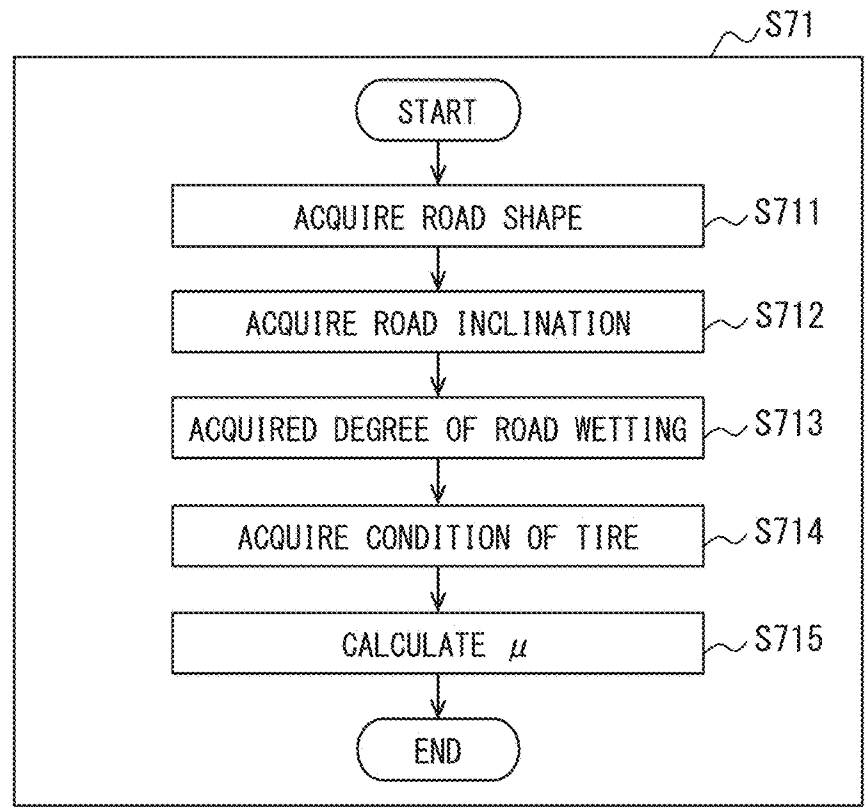
FIG. 21 is a drawing illustrating the processing of S71 in FIG. 20 in detail.

In the tenth embodiment, processing of S70 shown in FIG. 20 is performed instead of the processing shown in FIG. 13. At S71, a friction coefficient μ between the road surface of a road on which the subject vehicle is running and a tire of the subject vehicle and a friction coefficient μ between that road surface and a vehicle ahead are calculated. The details of the processing of S71 are shown in FIG. 21. At S711, a road shape is acquired. At S712, a road inclination is acquired. At S713, a degree of road wetting is acquired. These pieces of information are successively updated by the road condition determination unit 7274.

At S714, a condition of wear in a tire is acquired. This information is updated by the characteristic updating unit 7277. Like the processing of FIG. 13, the processing of FIG. 20 calculates the braking ability of the subject vehicle and a vehicle ahead. At S714, therefore, a condition of wear in a tire of the subject vehicle and a condition of wear in a tire of the vehicle ahead are acquired.

At S715, a friction coefficient μ between the subject vehicle and the road surface is calculated and further, a friction coefficient μ between the vehicle ahead and the road surface is calculated as well. A friction coefficient μ between the subject vehicle and the road surface and a friction coefficient μ between the vehicle ahead and the road surface are both calculated using the values acquired at S711 to S714 and a map or a function stored in advance for determining a friction coefficient μ based on these values.

The description will be back to FIG. 20. At S72, a vehicle weight of the subject vehicle is acquired and a vehicle weight of the vehicle ahead is estimated. As a vehicle weight of the subject vehicle, a value updated by the characteristic updating unit 7277 is acquired. A vehicle weight of the vehicle ahead is estimated as at S62 in the ninth embodiment.

At S73, the braking ability of the subject vehicle and the braking ability of the vehicle ahead are respectively estimated. At the point of time when the processing of S73 is performed, a friction coefficient μ, a vehicle weight, and a road inclination have been already acquired with respect to the subject vehicle and the vehicle ahead. A frictional force can be calculated from these pieces of information of friction coefficient μ, vehicle weight, and road inclination. The braking ability of each of the subject vehicle and the vehicle ahead from a preset relation between frictional force and braking ability based on this frictional force. Or, a map or a function with which the braking ability of each of the subject vehicle and the vehicle ahead can be directly determined from a friction coefficient μ, a vehicle weight, and a road inclination may be prepared in advance. The braking ability of each of the subject vehicle and the vehicle ahead may be estimated using the map or function without calculating a frictional force.

Summary of Tenth Embodiment

In the tenth embodiment, a friction coefficient μ between a tire of the subject vehicle and a road surface is determined. A friction coefficient μ is an example of a road condition. The braking ability of the subject vehicle is estimated based on the friction coefficient μ. The braking ability of the subject vehicle varies according to a friction coefficient μ between a tire of the subject vehicle and a road surface. Therefore, the braking ability of the subject vehicle can be estimated with higher accuracy as compared with a case where a friction coefficient μ between a tire of the subject vehicle and a road surface is not taken into account.

In the present embodiment, the braking ability of a vehicle ahead is estimated as well with a friction coefficient μ taken into account. A safe distance between a vehicle ahead and the subject vehicle is successively determined from the braking ability of the subject vehicle and the braking ability of the vehicle ahead successively estimated respectively with a friction coefficient μ taken into account. Therefore, the reliability of a safe distance is also enhanced.

Eleventh Embodiment

Figure 22:
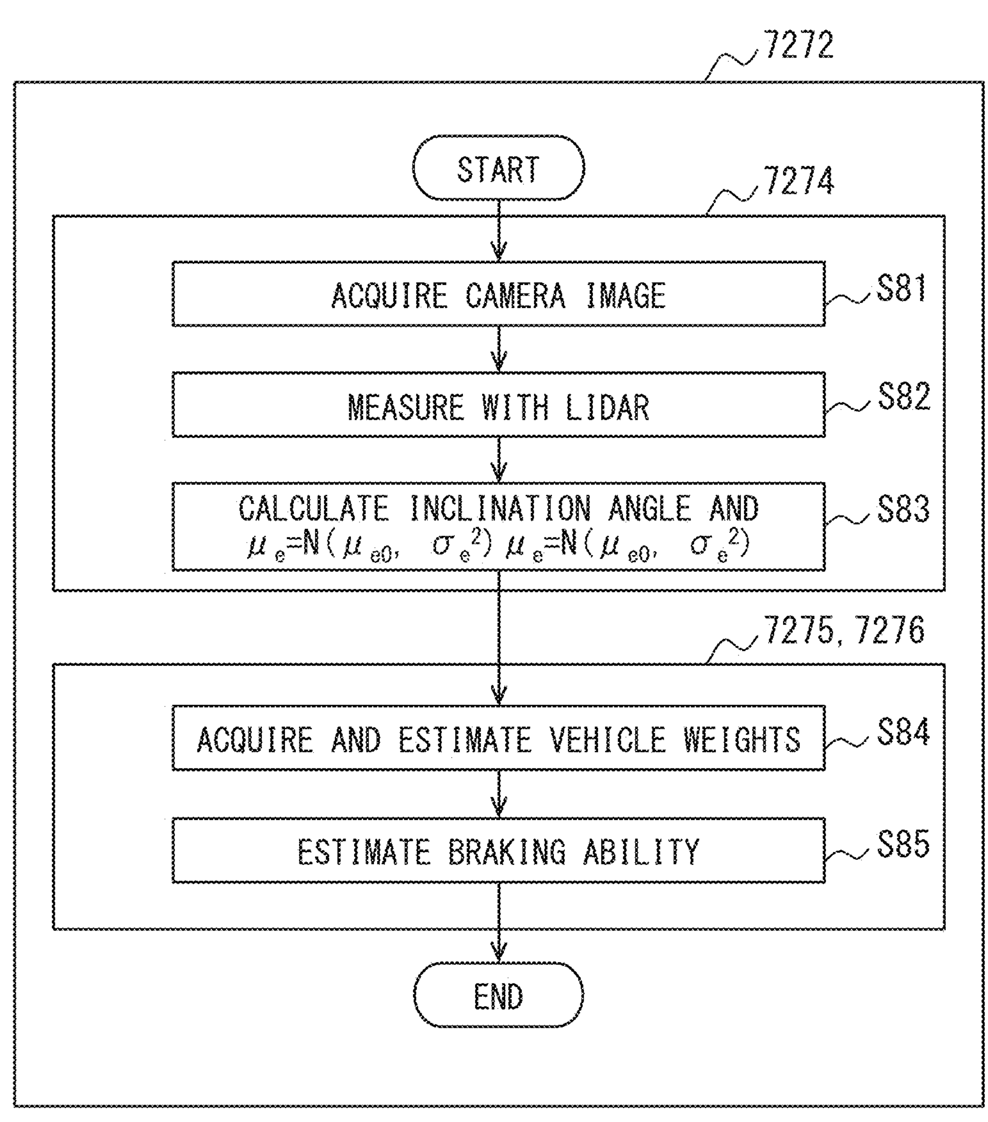
FIG. 22 is a drawing illustrating processing performed by a braking ability estimation unit 7272 in an eleventh embodiment.

FIG. 22 illustrates processing performed by the braking ability estimation unit 7272 in eleventh embodiment. Each of S81 to S83 is processing performed by the road condition determination unit 7274. Each of S84 and S85 is processing performed by the subject vehicle braking ability estimation unit 7275 and the another vehicle braking ability estimation unit 7276.

At S81, which is identical with S21, a camera image is acquired. At S82, which is identical with S22, a measurement value is acquired from Lidar. At S83, an inclination angle and a road surface friction coefficient μe are calculated from the camera image and the measurement value of Lidar acquired at S81 and S82. An inclination angle can be obtained, for example, from a result of road inclination measurement by Lidar. A road surface friction coefficient μe is a value representing a friction coefficient of a road surface. A friction coefficient is not determined by only one substance and varies when a combination of substances in contact with each other differs. A road surface friction coefficient μe cited here is a value determined when it is assumed that another substance in contact with a road surface is a preset standard tire.

A road surface friction coefficient $\mu_e$ is represented as having a normal distribution. That is, a road surface friction coefficient $\mu_e$ is expressed by Expression 1. In Expression 1, $\mu_{e0}$ denotes a median of the normal distribution and $\sigma_e^2$ denotes a variance of the normal distribution.

$$\mu_e = N(\mu_{e0}, \sigma_e^2) \quad \text{(Expression 1)}$$

A road surface friction coefficient $\mu_e$ is determined based on an uneven shape of a road surface determined by a camera image and measurement by Lidar. A correlation exists between an uneven shape of a road surface and a friction coefficient. Consequently, a relation between an uneven shape of a road surface and a road surface friction coefficient $\mu_e$ is determined in advance. A road surface friction coefficient $\mu_e$ is determined based on this relation and an uneven shape of a road surface determined by a camera image and measurement by Lidar.

At S84, a vehicle weight of the subject vehicle is acquired and further, a vehicle weight of the vehicle ahead is estimated. A vehicle weight of the subject vehicle is successively updated by the characteristic updating unit 7277. A vehicle weight of a vehicle ahead is estimated as at S62.

At S85, braking ability is estimated. A method for estimating braking ability here is substantially identical with that at S73 in the tenth embodiment. The processing of S85 is different from that of S73 in that a road surface friction coefficient $\mu_e$ is used in place of a friction coefficient μ used at S73. Since a road surface friction coefficient $\mu_e$ is used in place of a friction coefficient μ, a map or a function for determining braking ability is different from those at S73. The other respects are the same as at S73.

In the tenth embodiment, the subject vehicle braking ability estimation unit 7275 and the another vehicle braking ability estimation unit 7276 calculate a friction coefficient μ based on a road shape, a road inclination, and the like determined by the road condition determination unit 7274. In the eleventh embodiment, meanwhile, the road condition determination unit 7274 calculates an inclination angle and a road surface friction coefficient $\mu_e$. In spite of this difference, also in the eleventh embodiment, the braking ability of the subject vehicle is estimated based on a road surface friction coefficient $\mu_e$ as an example of a road condition. Therefore, the braking ability of the subject vehicle can be estimated with accuracy.

Since the braking ability of a vehicle ahead is also estimated based on a road surface friction coefficient $\mu_e$, the reliability of a safe distance between the vehicle ahead and the subject vehicle determined based on the braking ability of the subject vehicle and the braking ability of the vehicle ahead is also enhanced.

Twelfth Embodiment

Figure 23:
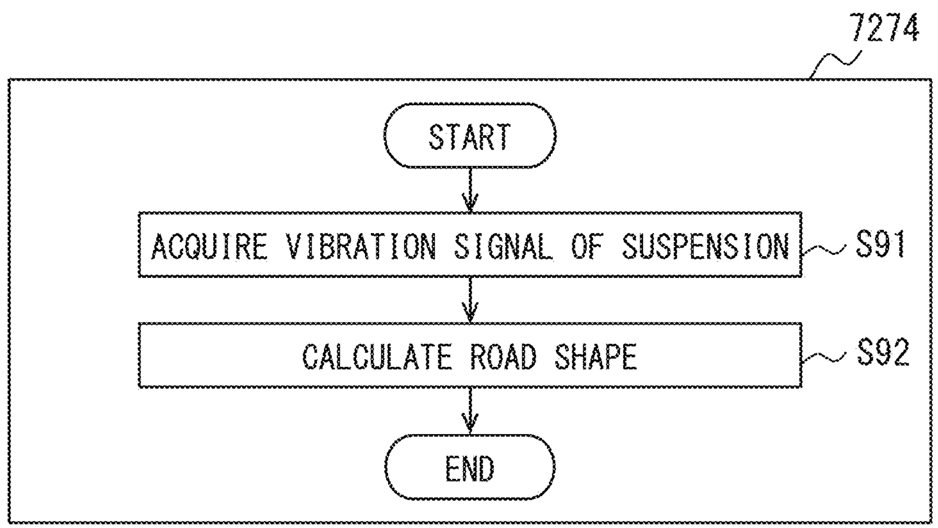
FIG. 23 is drawing illustrating processing performed by a road condition determination unit 7274 in a twelfth embodiment.

In the twelfth embodiment, the road condition determination unit 7274 calculates a road shape by the processing shown in FIG. 23. At S91, a vibration signal of a suspension is acquired. A vibration signal of a suspension can be detected with a vibration sensor attached to the suspension. At S92, such a technique as independent component analysis is applied to the signal acquired at S91 to extract a signal derived from the unevenness of the road surface. Then, an uneven shape of the road surface is determined from the signal derived from the unevenness of the road surface.

Aside from calculation of a road shape, the techniques described in relation to the above embodiments are applicable. As in the twelfth embodiment, a road shape may be indirectly calculated by detecting vibration from a road surface propagated to the subject vehicle with a sensor attached to the subject vehicle.

Thirteenth Embodiment

Figure 24:
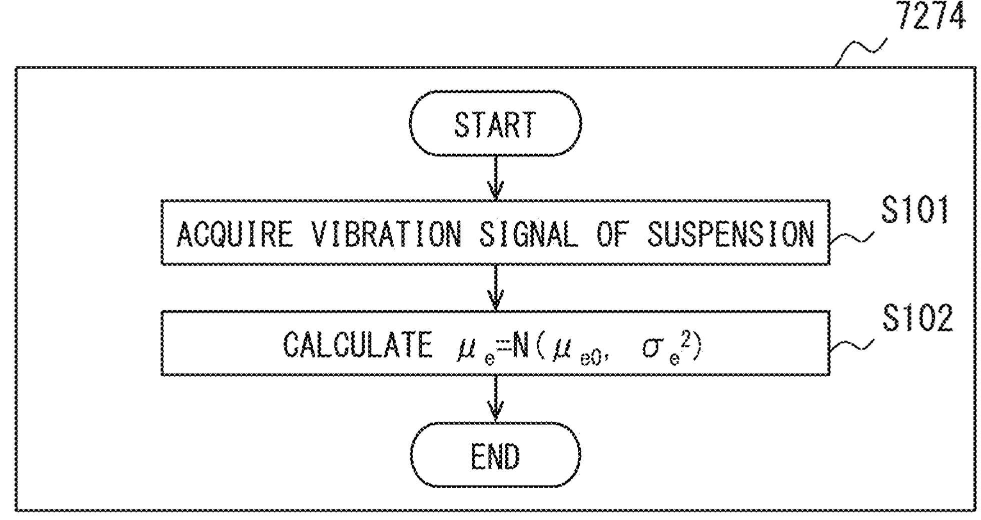
FIG. 24 is a drawing illustrating processing performed by a road condition determination unit 7274 in a thirteenth embodiment.

In the thirteenth embodiment, the road condition determination unit 7274 calculates a road surface friction coefficient $\mu_e$ by the processing shown in FIG. 24. At S101, a vibration signal of a suspension is acquired. This processing is the same as that of S91. At S102, such a technique as independent component analysis is applied to the signal acquired at S101 to extract a signal derived from the unevenness of a road surface. An uneven shape of the road surface is determined from the signal derived from the unevenness of the road surface. A road surface friction coefficient $\mu_e$ is calculated based on the uneven shape of the road surface as at S83.

Processing after the calculation of a road surface friction coefficient $\mu_e$ is identical with that in the eleventh embodiment. As in the thirteenth embodiment, a road surface friction coefficient $\mu_e$ may be calculated based on a signal based on a signal detected by a sensor attached to the subject vehicle.

Fourteenth Embodiment

Figure 25:
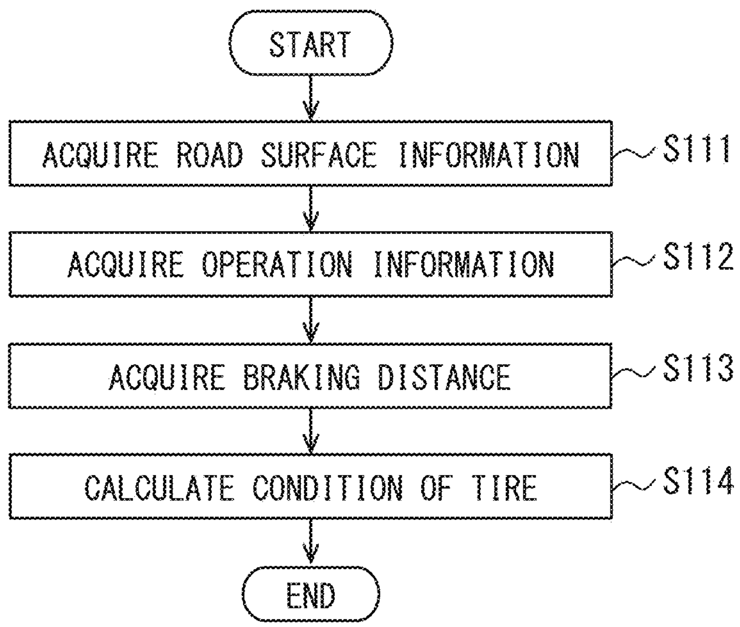
FIG. 25 is a drawing illustrating processing performed by a characteristic updating unit 7277 in a fourteenth embodiment.

In the fourteenth embodiment, the characteristic updating unit 7277 successively performs the processing shown in FIG. 25 and successively updates a condition of a tire. A condition of a tire refers to a condition related to a tire and has an influence on braking ability. Therefore, a condition of a tire is an example of a brake influencing factor. In the fourteenth embodiment, specifically, a tire friction coefficient μW is calculated as a condition of a tire.

In FIG. 25, at S111, road surface information is acquired. Road surface information is specifically a road surface friction coefficient $\mu_e$ described with reference to FIG. 22. At S112, operation information is acquired. Operation information includes an amount by which a driver of the subject vehicle depresses a brake pedal or an amount of change in brake oil pressure varied in conjunction therewith. A speed of the subject vehicle obtained when the subject vehicle starts deceleration by the driver's brake pedal operation is also included in operation information.

When the subject vehicle is stopped as the result of a driver of the subject vehicle operating a brake pedal at S112, at S113, a braking distance traveled from the brake pedal operation to the stop of the subject vehicle is acquired.

At S114, a tire friction coefficient μW is calculated based on the road surface information, operation information, and braking distance acquired at S111, S112, and S113. A relation between road surface information, operation information, and braking distance and tire friction coefficient $\mu_W$ is determined in advance based on an experiment or the like. A tire friction coefficient $\mu_W$ is calculated based on this predetermined relation and the road surface information, operation information, and braking distance acquired at S111, S112, and S113.

A friction coefficient is determined by various factors and cannot be uniquely determined only by road surface information, operation information, and a braking distance. Therefore, like the road surface friction coefficient $\mu_e$ described in relation to the eleventh embodiment, a tire friction coefficient $\mu_W$ also has a distribution. Specifically, a tire friction coefficient is expressed by Expression 2 as having a normal distribution. In Expression 2, $\mu_{W0}$ denotes a median of a normal distribution and $\sigma_W^2$ denotes a variance of the normal distribution.

$$\mu_W = N(\mu_{W0}, \sigma_W^2) \quad \text{(Expression 2)}$$

Figure 26:
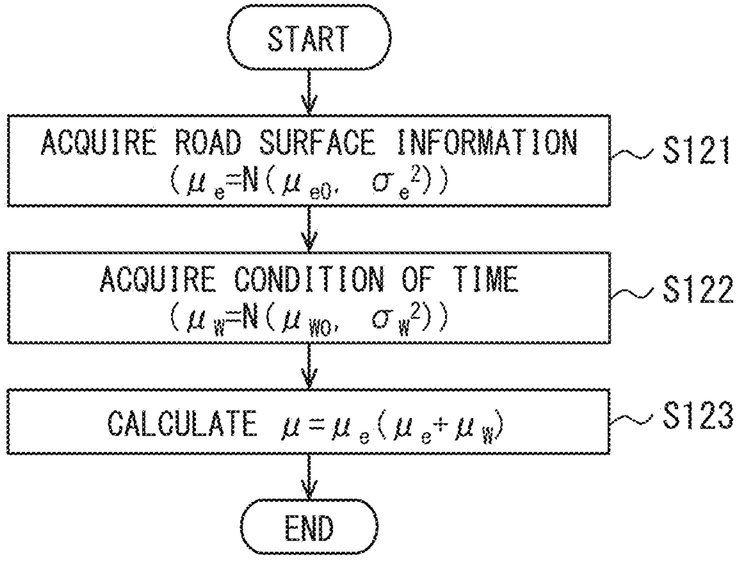
FIG. 26 is a drawing illustrating processing of calculating a friction coefficient μ in the fourteenth embodiment.

In the fourteenth embodiment, the subject vehicle braking ability estimation unit 7275 and the another vehicle braking ability estimation unit 7276 estimate the braking ability of the subject vehicle and the braking ability of a vehicle ahead based on a friction coefficient μ calculated by performing the processing in FIG. 26. The processing shown in FIG. 26 is performed in place of that shown in FIG. 21.

At S121, a road surface friction coefficient $\mu_e$ as road surface information is acquired from the road condition determination unit 7274. The road condition determination unit 7274 calculates a road surface friction coefficient $\mu_e$ by the processing described with reference to FIG. 22. At S122, the tire friction coefficient $\mu_W$ calculated at S114 is acquired. At S123, a friction coefficient μ is calculated by Expression 3 based on the road surface friction coefficient $\mu_e$ acquired at S121 and the tire friction coefficient pw acquired at S122.

$$\mu = \mu_e(\mu_e + \mu_W) \quad \text{(Expression 3)}$$

After the calculation of a friction coefficient μ, the processing proceeds to S72 in FIG. 20. As mentioned above, in place of the calculation method for μ described in relation to the tenth embodiment, a road surface friction coefficient $\mu_e$ and a tire friction coefficient $\mu_W$ can also be calculated and a friction coefficient μ between a road surface and a tire can also be calculated from these two friction coefficients.

Fifteenth Embodiment

Figure 27:
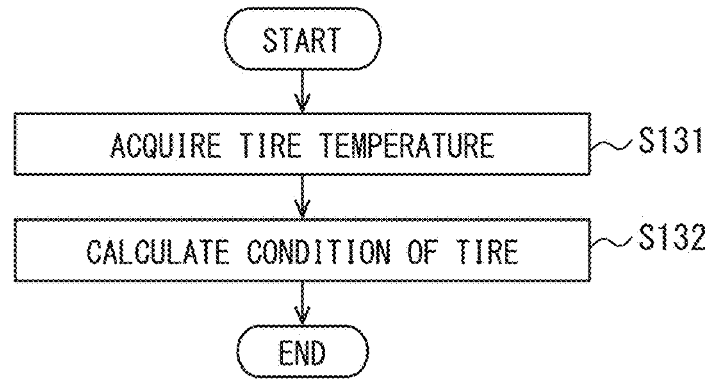
FIG. 27 is a drawing illustrating processing performed by a characteristic updating unit 7277 in a fifteenth embodiment.

FIG. 27 illustrates processing performed by the characteristic updating unit 7277 in the fifteenth embodiment instead of the processing in FIG. 25. At S131, a tire temperature of the subject vehicle is acquired. A tire temperature is detected, for example, with a thermos camera installed in a position where an image of a tire can be picked up. At S132, a tire friction coefficient $\mu_W$ which is an example of a condition of a tire is calculated based on the tire temperature. When a tire temperature varies, a tire friction coefficient $\mu_W$ varies. Consequently, a relation between tire temperature and tire friction coefficient $\mu_W$ is determined in advance and a tire friction coefficient $\mu_W$ is calculated based on this relation and the tire temperature acquired at S131. A tire friction coefficient $\mu_W$ determined at S132 also has a distribution. The tire temperature used to calculate a tire friction coefficient $\mu_W$ is also an example of a condition of a tire.

Sixteenth Embodiment

Figure 28:
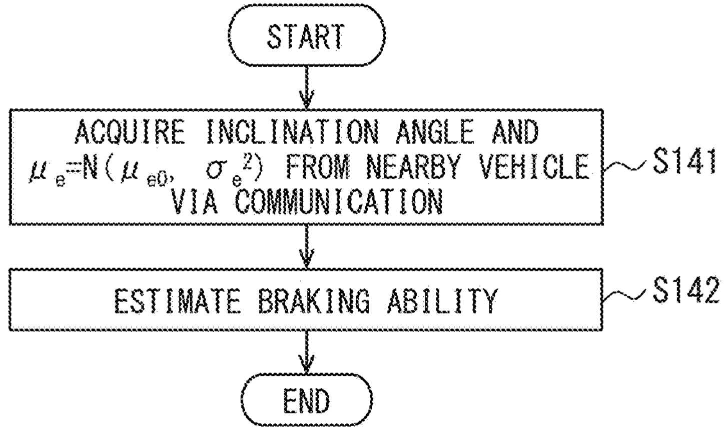
FIG. 28 is a drawing illustrating processing of estimating braking ability in a sixteenth embodiment.

FIG. 28 illustrates processing performed by the road condition determination unit 7274, the subject vehicle braking ability estimation unit 7275, and the another vehicle braking ability estimation unit 7276 in the sixteenth embodiment. The processing of S141 is performed by the road condition determination unit 7274. At S141, an inclination angle and a road surface friction coefficient $\mu_e$ are acquired from a nearby vehicle via inter-vehicle communication. In the sixteenth embodiment, the subject vehicle is provided with a radio set for wireless communication with a nearby vehicle.

When a nearby vehicle is provided with the braking ability estimation unit 7272 described in relation to the eleventh embodiment and a radio set and the nearby vehicle successively transmits a measured inclination angle and a road surface friction coefficient $\mu_e$, the subject vehicle can acquire the inclination angle and the road surface friction coefficient $\mu_e$ from the nearby vehicle.

At S142, the braking ability of the subject vehicle and the braking ability of the vehicle ahead are estimated based on the inclination angle and road surface friction coefficient $\mu_e$ acquired at S141. As shown in FIG. 20, a vehicle weight of the subject vehicle and a vehicle weight of the vehicle ahead may be acquired or estimated and the braking ability of the subject vehicle and the braking ability of the vehicle ahead may be estimated with the vehicle weight of the subject vehicle and the vehicle weight of the vehicle ahead taken into account. However, the braking ability of the subject vehicle and the braking ability of the vehicle ahead may be estimated without use of the vehicle weight of the subject vehicle or the vehicle ahead.

Seventeenth Embodiment

Figure 29:
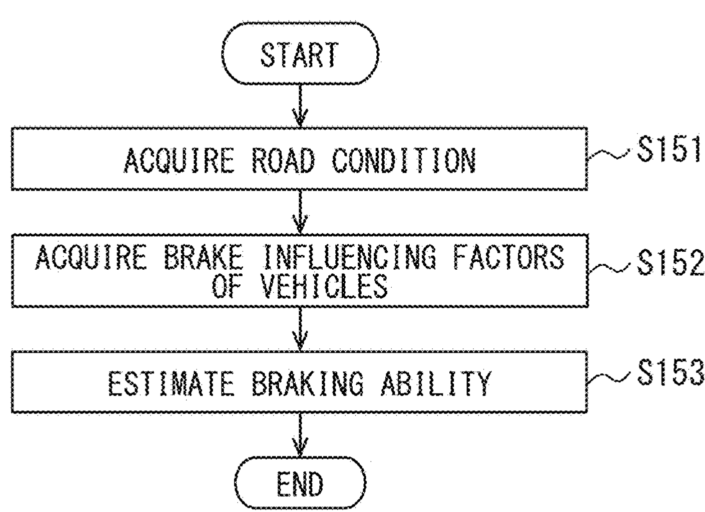
FIG. 29 is a drawing illustrating braking ability estimation processing in a seventeenth embodiment.

FIG. 29 illustrates processing performed in the seventeenth embodiment in place of the processing in FIG. 13. The seventeenth embodiment is a combination of embodiments described up to this point. At S151, a road condition is acquired. As a road condition, various concrete conditions described in relation to the above embodiments can be adopted. A road condition is specifically, a road inclination, a road shape, a degree of road wetting, a road surface friction coefficient $\mu_e$, or the like. At S151, one or more of the concrete road conditions described up to this point are acquired.

At S152, a brake influencing factor of the subject vehicle and a brake influencing factor of a vehicle ahead are acquired. As a brake influencing factor of the subject vehicle and a brake influencing factor of the vehicle ahead acquired at S152, one or more of the various concrete brake influencing factors described in relation to the above embodiments can be adopted.

At S153, the braking ability of the subject vehicle and the braking ability of the vehicle ahead are estimated with both the road condition and brake influencing factor acquired at S151 and S152 taken into account. Also, at S153, to estimate braking ability, a relation with which braking ability can be estimated based on a road condition and a brake influencing factor is determined in advance. The braking ability of the subject vehicle and the braking ability of the vehicle ahead are estimated based on this relation and the information acquired at S151 and S152.

In the seventeenth embodiment, a road condition and brake influencing factors of vehicles are both taken into account to estimate the braking ability of the subject vehicle and the braking ability of a vehicle ahead. Therefore, the braking ability of the subject vehicle and the braking ability of the vehicle ahead can be estimated with higher accuracy.

Eighteenth Embodiment

Figure 30:
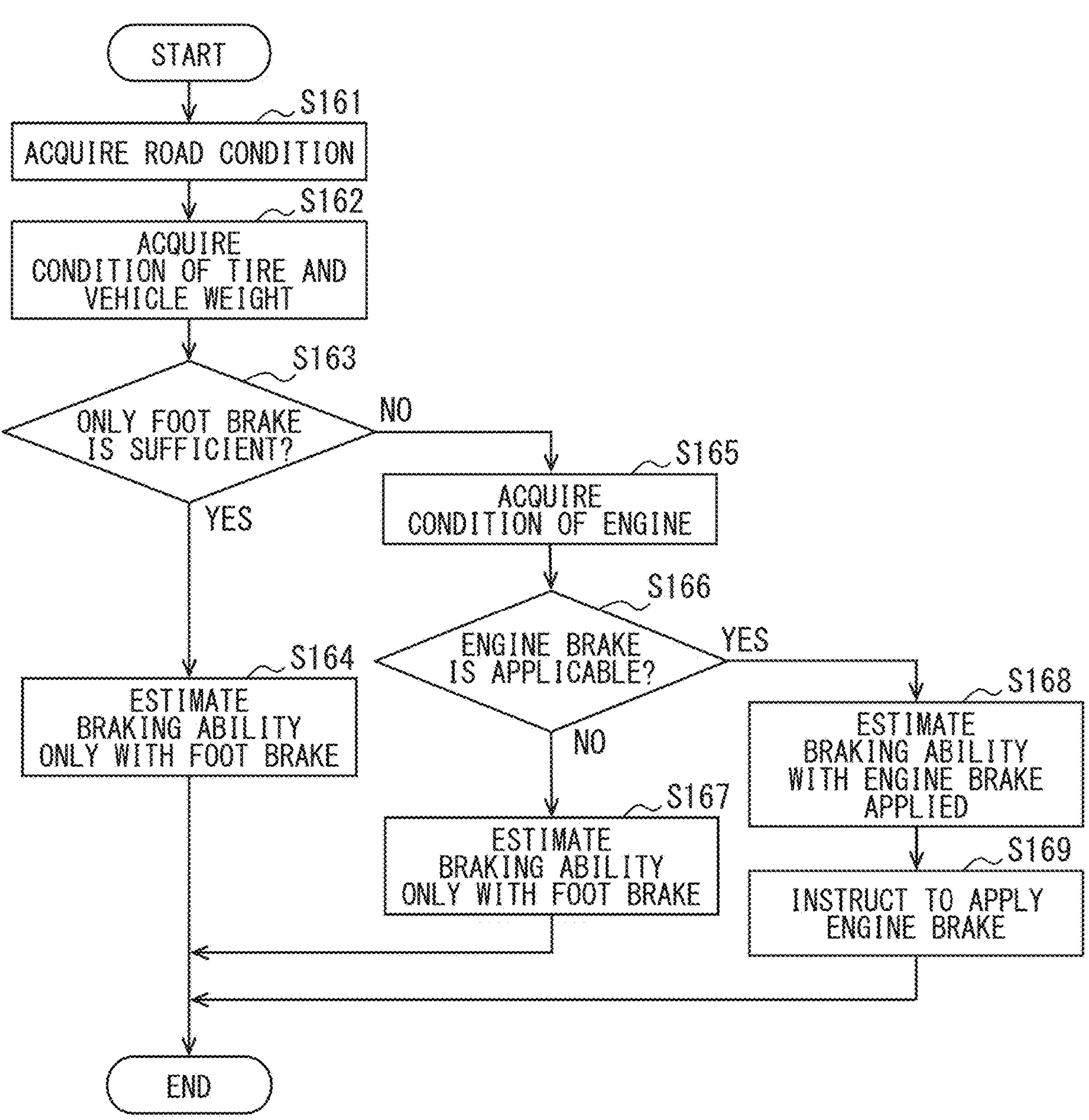
FIG. 30 is a drawing illustrating processing performed by a subject vehicle braking ability estimation unit 7275 in an eighteenth embodiment.

FIG. 30 illustrates processing performed by the subject vehicle braking ability estimation unit 7275 in the eighteenth embodiment. At S161, a road condition is acquired. Road condition is information for estimating whether the subject vehicle skids when decelerated with full-braking. Examples of road conditions are the above-mentioned road shape, road inclination, and degree of road wetting. Further, a road condition may be a road surface friction coefficient $\mu_e$.

At S162, a condition of a tire and a vehicle weight of the subject vehicle are acquired. As mentioned above, a condition of a tire is a condition related to the tire and has an influence on braking ability. Specifically, example of conditions of a tire are a tire friction coefficient $\mu_W$, a tire temperature, and the like.

At S163, it is determined whether only a foot brake is sufficient. Whether only a foot brake is sufficient is information for determining whether skidding occurs when full-braking is applied only by a foot brake. "Only a foot brake" cited here means that an engine brake cannot be actively applied. When a foot brake is applied, an accelerator is turned off. Provided with an engine as a driving force source, an engine brake is automatically caused to act when the accelerator is turned off. That an engine brake is actively utilized refers to that when a foot brake is applied, instead of using such an automatically acting engine brake, a gear ratio is changed to a higher value to generate larger braking force than the automatically acting engine brake does. When skidding does not occur by full-braking only with a foot brake, YES is taken as a result of the judgment at S163.

To determine whether skidding occur only with a foot brake, frictional force produced between a tire and the road surface by applying full-braking is compared with inertia force produced on the subject vehicle during deceleration. When the frictional force is larger, the subject vehicle does not skid. Frictional force is calculated from a friction coefficient $\mu$ between the road surface and a tire and a vehicle weight. A friction coefficient $\mu$ between a road surface and a tire is calculated, for example, by the processing shown in FIG. 21 or FIG. 26. Inertia force produced on the subject vehicle during deceleration can be calculated by multiplying a decelerated speed preset as decelerated speed during full-braking by a vehicle weight.

When a result of the judgment at S163 is YES, the processing proceeds to S164. At S164, braking ability only with a foot brake is estimated. Braking ability only with a foot brake is braking ability that is estimated at S55 when it is determined at S53 that an engine brake is unavailable in the processing shown in FIG. 17.

When a result of the judgment at S163 is NO, the processing proceeds to S165. At S165, a condition of an engine is acquired. A condition of an engine is information indicating that the subject vehicle is mounted with an engine and whether the engine is in a state in which a gear ratio can be increased.

At S166, whether an engine brake is applicable is determined based on the information acquired at S165. When a result of the judgement at S166 is NO, the processing proceeds to S167. The processing of S167 is the same as that of S164. That is, at S167, braking ability only with a foot brake is estimated.

When a result of the judgment at S166 is YES, the processing proceeds to S168. At S168, braking ability with an engine brake applied is estimated. As described in relation to S55, braking ability with an engine brake applied has, for example, a distribution of braking ability. Braking ability with an engine brake applied, the center value of a distribution of braking ability is changed to the higher side of braking ability by a preset certain value than when an engine brake is unavailable. At S169, utilization of an engine brake is notified to ECU controlling a transmission.

In the eighteenth embodiment, braking ability obtained when an engine brake is applied in addition to a foot brake is estimated. By applying an engine brake when the engine brake is applicable a braking distance of the subject vehicle can be shortened.

Nineteenth Embodiment

Figure 31:
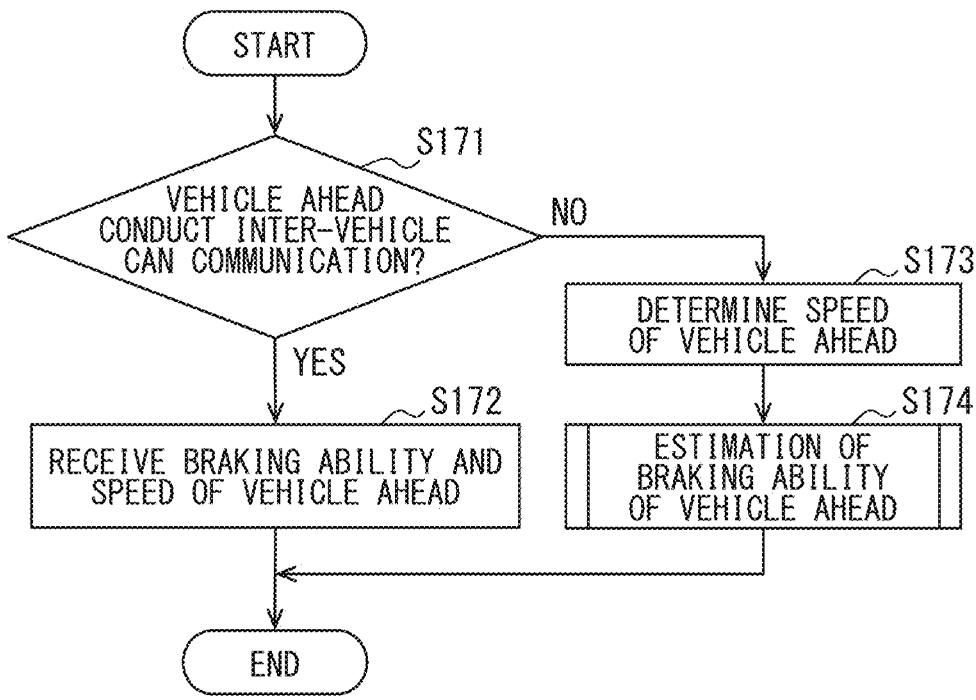
FIG. 31 is a drawing illustrating processing performed by an another vehicle braking ability estimation unit 7276 in a nineteenth embodiment.

FIG. 31 illustrates processing performed by the another vehicle braking ability estimation unit 7276 in the nineteenth embodiment. At S171, it is determined whether inter-vehicle communication with a vehicle ahead is feasible. This determination is made according to whether a signal transmitted from the vehicle ahead could be received. When a result of the judgment at S171 is YES, the processing proceeds to S172.

At S172, inter-vehicle communication with the vehicle ahead is conducted to receive the braking ability of the vehicle ahead and a speed of the vehicle ahead. When the vehicle ahead is mounted with a vehicle control apparatus as the subject vehicle is, not only a speed of the vehicle ahead but also the braking ability of the vehicle ahead can be received from the vehicle ahead.

When a result of the judgment at S171 is NO, the processing proceeds to S173. At S173, a speed of the vehicle ahead is determined. This processing is the same as that described in relation to S31. At S174, the braking ability of the vehicle ahead is estimated. This processing is the same as that of S34. Also, when inter-vehicle communication with the vehicle ahead is feasible but braking ability could not be received from the vehicle ahead, the processing of S173 and S174 can be performed.

The braking ability of the vehicle ahead estimated by the vehicle ahead, received via inter-vehicle communication is expected to be more accurate than the braking ability of the vehicle ahead estimated by the subject vehicle. Therefore, by utilizing the braking ability of the vehicle ahead estimated by the vehicle ahead, the accuracy of prediction of an action of the vehicle ahead is enhanced.

Up to this point, embodiments of the present disclosure have been described but the disclosed technology is not limited to the above-mentioned embodiments. The following modifications are included in the disclosed scope and aside from the following, the disclosed technology can be variously modified and implemented without departing from the subject matter thereof.

Modification 1

A road surface friction coefficient $\mu_e$ is a value that can be determined without a condition of a tire taken into account. Consequently, a road surface friction coefficient $\mu_e$ may be stored in advance as map information and a road surface friction coefficient $\mu_e$ of a road on which the subject vehicle is running may be acquired from the map information based on the present position of the subject vehicle.

Modification 2

In the sixteenth embodiment, an inclination angle and a road surface friction coefficient $\mu_e$ are received from a nearby vehicle via inter-vehicle communication. Instead, an inclination angle and a road surface friction coefficient $\mu_e$ may be received from roadside equipment. Communication between the subject vehicle and a nearby vehicle may be by way of a base station.

Modification 3

In the nineteenth embodiment, the subject vehicle receives the braking ability of a vehicle ahead via inter-vehicle communication. Instead, the subject vehicle may receive the braking ability of a vehicle ahead via communication by way of a base station.

Modification 4

In the seventh embodiment, braking ability is estimated based on a road shape, a road inclination, and a degree of road wetting as a road condition. Instead, only any two or any one of a road shape, a road inclination, and a degree of road wetting may be used to estimate braking ability.

The present disclosure is not limited to the above-mentioned embodiments and can be variously modified within a scope described in what is claimed is. An embodiment obtained by appropriately combining a disclosed technical means respectively with different embodiments is also included in the technical scope of the present disclosure. A control unit described in the present disclosure and a technique therefor may be implemented by a dedicated computer constituting a processor programmed to perform one or more functions embodied by a computer program. Or, a device described in the present disclosure and a technique therefor may be implemented by a dedicated hardware logic circuit. Alternatively, a device described in the present disclosure and a technique therefor may be implemented by one or more dedicated computers configured of a combination of a processor executing a computer program and one or more hardware logic circuits. A computer program may be stored in a computer-readable non-transitory tangible recording medium as an instruction executed by a computer.

What is claimed is:

1. An autonomous driving device used in a vehicle capable of autonomous driving, the autonomous driving device comprising a processor and a non-volatile storage medium, wherein the processor is configured to:

calculate a travel plan for causing the vehicle to travel;

acquire a rule from a rule database that stores the rule serving as a basis for making a judgment regarding a potential accident;

predict a behavior of a prediction target moving body that includes the vehicle and at least one moving body present in a vicinity of the vehicle;

execute the judgment regarding the potential accident by applying the predicted behavior of the prediction target moving body to the rule, and by determining a value indicating a contribution of the vehicle to the potential accident; and when it is determined that the potential accident may occur, instruct recalculation of the travel plan or prohibit travel along the travel plan;

output, to a vehicle control ECU of the vehicle, a control signal for autonomously controlling at least one of acceleration/deceleration and steering based on the travel plan; and store the predicted behavior of the prediction target moving body in the storage medium.

2. The autonomous driving device according to claim 1, wherein the processor is further configured to in executing the judgment regarding the potential accident, execute the judgment regarding the potential accident assumed when the vehicle is to travel on a candidate route calculated as a short-term travel plan, and in storing, store the candidate route along with the predicted behavior of the prediction target moving body in the storage medium.

3. The autonomous driving device according to claim 2, wherein the processor is configured to in acquiring the rule, determine which rule should be adopted at a current position of the vehicle and at each position on the candidate route.

4. The autonomous driving device according to claim 3, wherein the processor is configured to in storing, store one or more of rules determined to be adopted in the storage medium.

5. The autonomous driving device according to claim 1, wherein the behavior of the prediction target moving body is expressed to include an elapsed time from a present time and the position at that time.

6. The autonomous driving device according to claim 1, wherein the processor is configured to, in predicting, predict deviation behavior that deviates from the behavior along the travel control, and in storing, store the behavior of the prediction target moving body in the storage medium when the deviation behavior is predicted.

7. The autonomous driving device according to claim 1, wherein the processor is further configured to store a judgment result regarding the potential accident.

8. The autonomous driving device according to claim 7, wherein the processor is further configured to, when an inter-vehicle distance between the vehicle and a surrounding vehicle of the vehicle becomes less than a set safe distance, execute autonomous driving to perform avoidance behavior to avoid proximity between the vehicle and the surrounding vehicle, and the judgment result regarding the potential accident includes whether a safe distance is secured as one indicator.

9. The autonomous driving device according to claim 1, wherein the processor is further configured to store, in the non-volatile storage medium, time correlated to the predicted behavior and at least one of (i) a behavior recognized by a behavior recognition unit and (ii) a detection value of a behavior detection sensor, in association with the predicted behavior, such that the predicted behavior is verifiable with reference to the recognized behavior and/or the detection value.

10. The autonomous driving device according to claim 1, wherein the value is an accident responsibility value of the vehicle that indicates a degree of responsibility of the vehicle for the potential accident.

11. The autonomous driving device according to claim 10, wherein the accident responsibility value is a percentage.

12. The autonomous driving device according to claim 1, wherein the rule database stores the rule on a location-by-location basis, and the processor is configured to acquire, from the rule database, a rule corresponding to a current position of the vehicle and positions along the travel plan.

13. An autonomous driving method used in a vehicle capable of autonomous driving, executed by a processor configured in a computer, the autonomous driving method comprising:

calculating a travel plan for causing the vehicle to travel;

acquiring a rule from a rule database that stores the rule serving as a basis for judging a potential accident;

predicting a behavior of a prediction target moving body, including the vehicle and at least one moving body present around the vehicle;

executing the judgment regarding the potential accident by applying the predicted behavior of the prediction target moving body to the rule, and by determining a value indicating a contribution of the vehicle to the potential accident;

when it is determined that the potential accident may occur, instructing recalculation of the travel plan or prohibit travel along the travel plan;

outputting, to a vehicle control ECU of the vehicle, a control signal for autonomously controlling at least one of acceleration/deceleration and steering based on the travel plan; and storing the predicted behavior of the prediction target moving body in a storage medium.

14. A non-transitory computer readable storage medium storing a program used in a vehicle capable of autonomous driving, readable by a computer, configured to execute, by a processor configured in the computer:

calculating a travel plan for causing the vehicle to travel;

acquiring a rule from a rule database that stores the rule serving as a basis for judging potential accidents;

predicting a behavior of a prediction target moving body, including the vehicle and at least one moving body present around the vehicle;

executing the judgment regarding the potential accident by applying the predicted behavior of the prediction target moving body to the rule, and by determining a value indicating a contribution of the vehicle to the potential accident;

when it is determined that the potential accident may occur, instructing recalculation of the travel plan or prohibit travel along the travel plan;

outputting, to a vehicle control ECU of the vehicle, a control signal for autonomously controlling at least one of acceleration/deceleration and steering based on the travel plan; and storing the predicted behavior of the prediction target moving body in a storage medium.

* * * * *